INVENTOR
GENUNG L. CLAPPER

BY [signature]
AGENT

March 10, 1970    G. L. CLAPPER    3,499,990
SPEECH ANALYZING SYSTEM

Filed Sept. 7, 1967    15 Sheets-Sheet 2

E P D
ENVELOPE PEAK DETECTOR

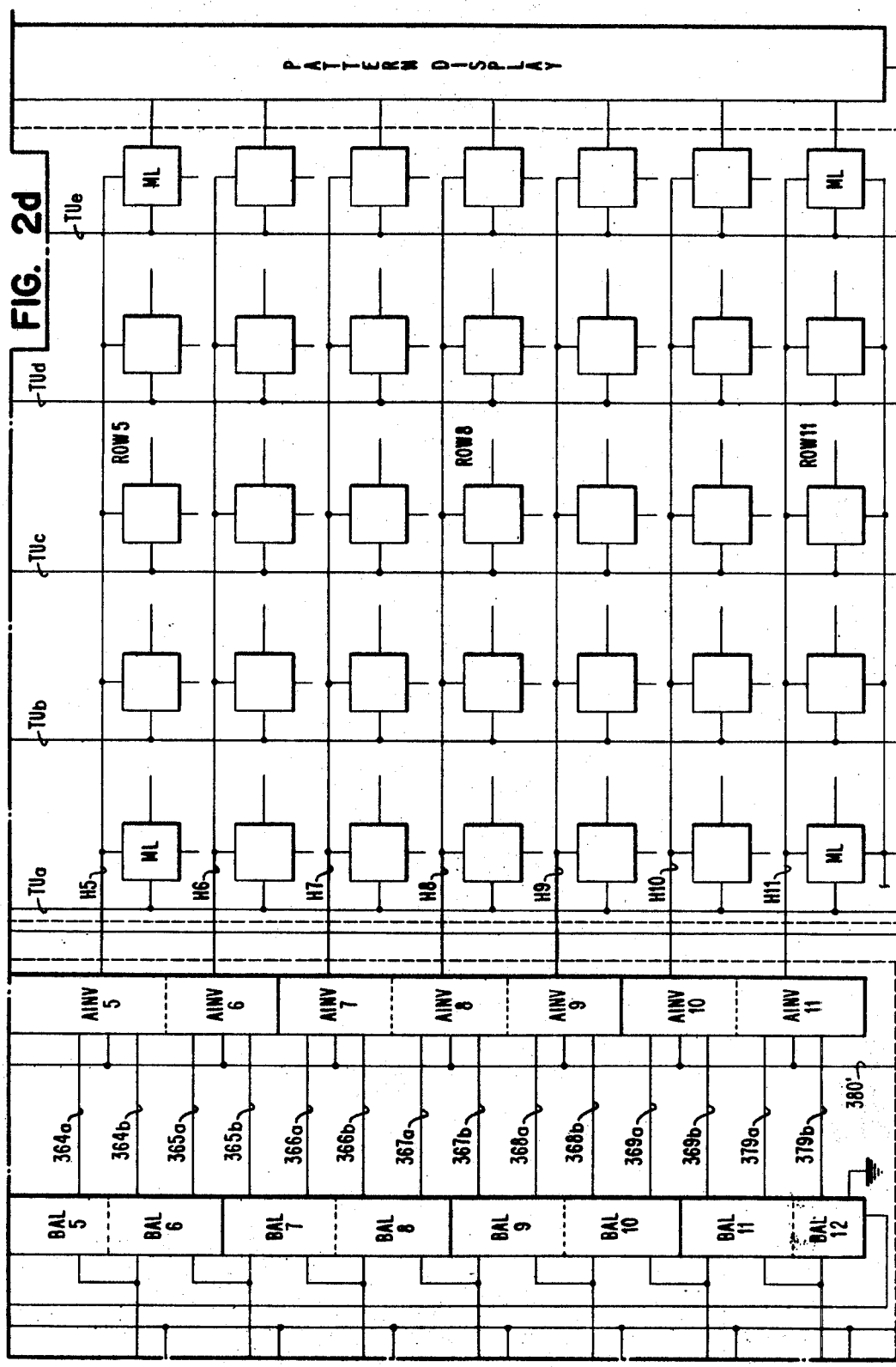

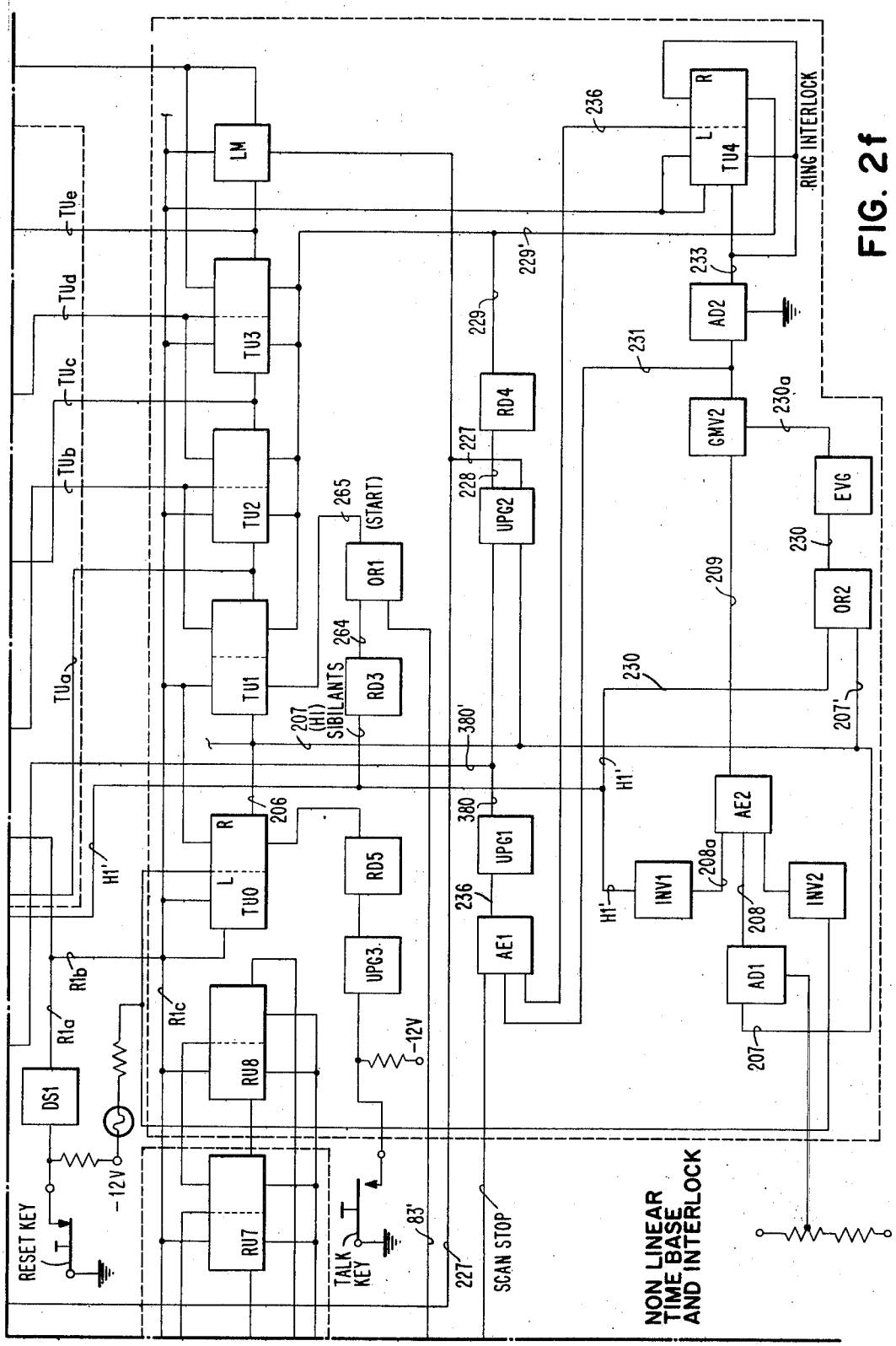

FS
FRICATIVE SELECTOR

AND INVERT
AINV

ML

March 10, 1970  G. L. CLAPPER  3,499,990
SPEECH ANALYZING SYSTEM
Filed Sept. 7, 1967  15 Sheets-Sheet 12
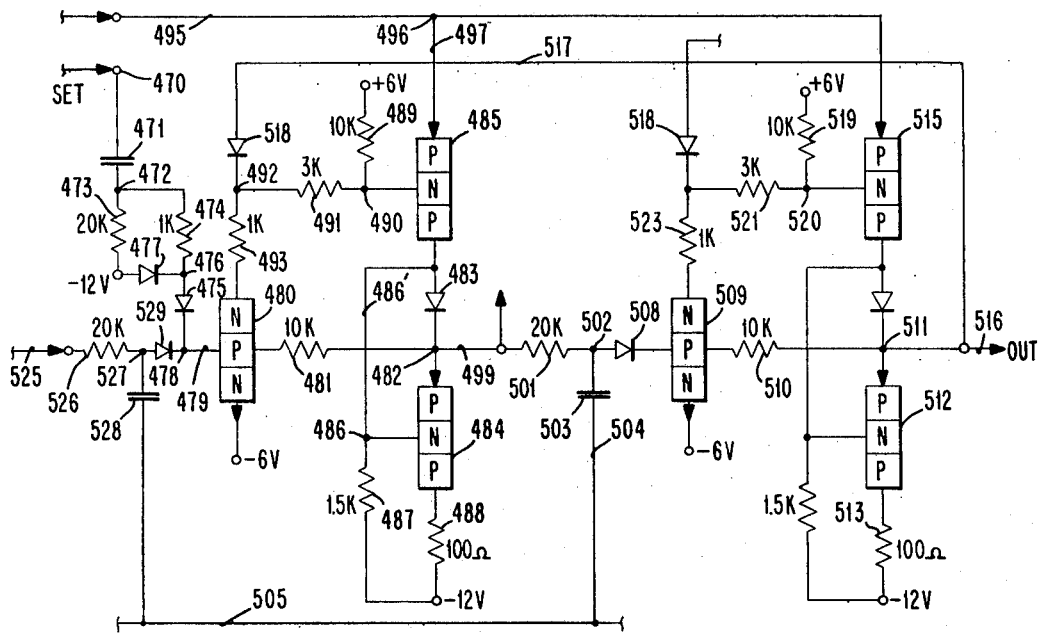
RING UNITS  FIG. 12
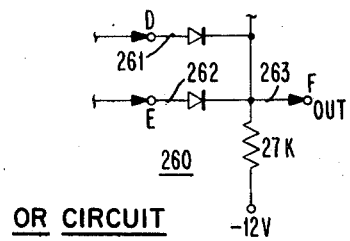
OR CIRCUIT
FIG. 13
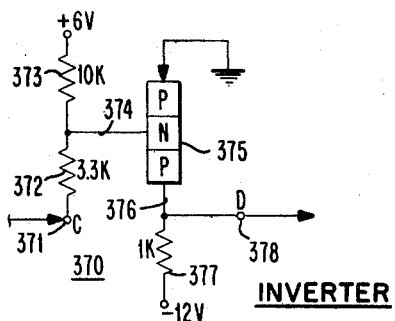
INVERTER
FIG. 14
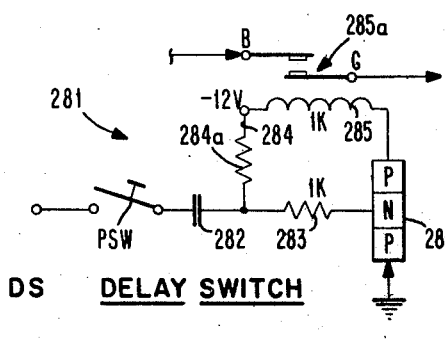
DS  DELAY SWITCH  FIG. 15

SCAN COUNTER SCC

INTERLOCKED BALANCE UNITS

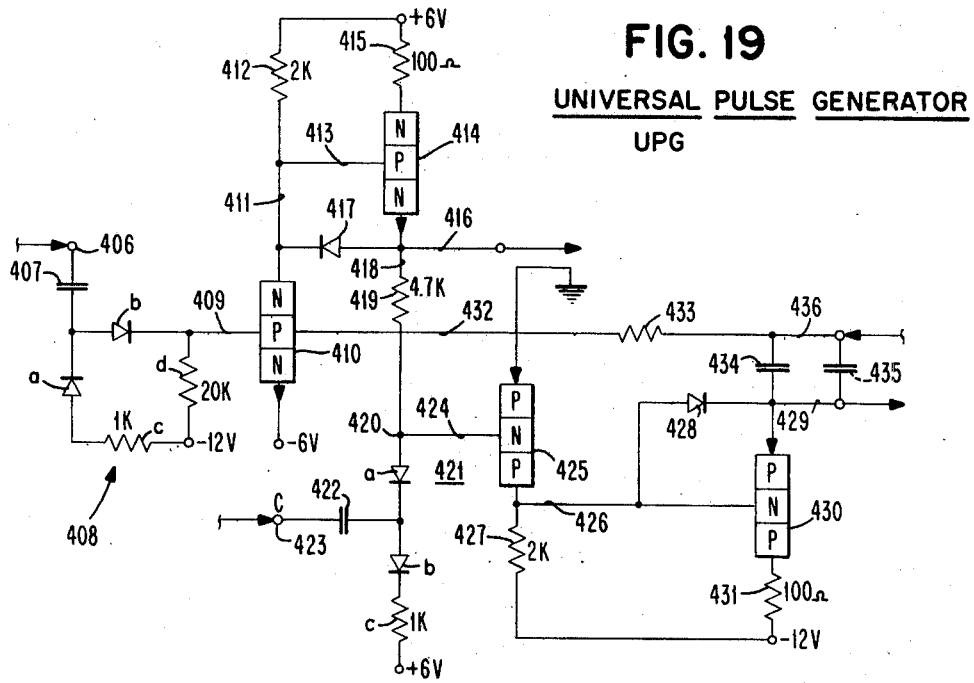
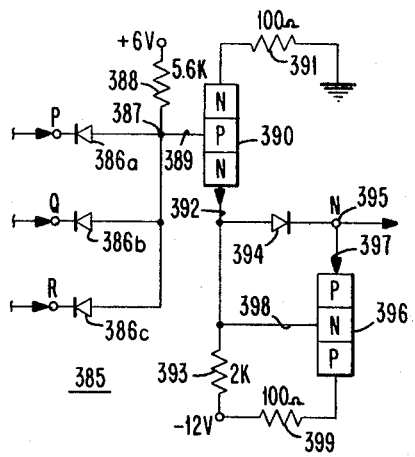
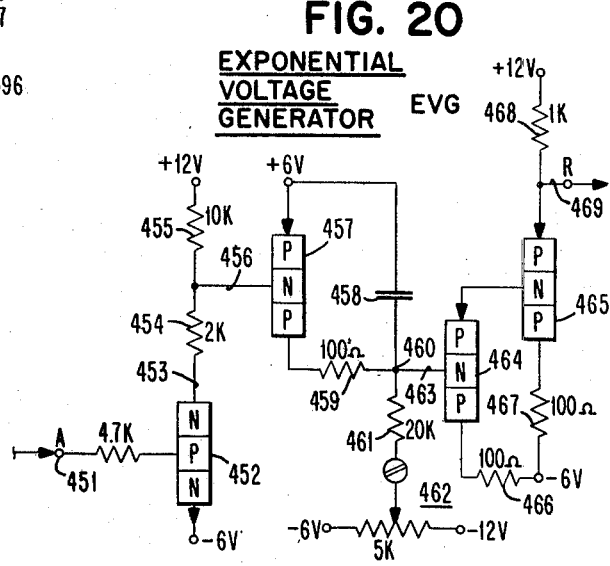

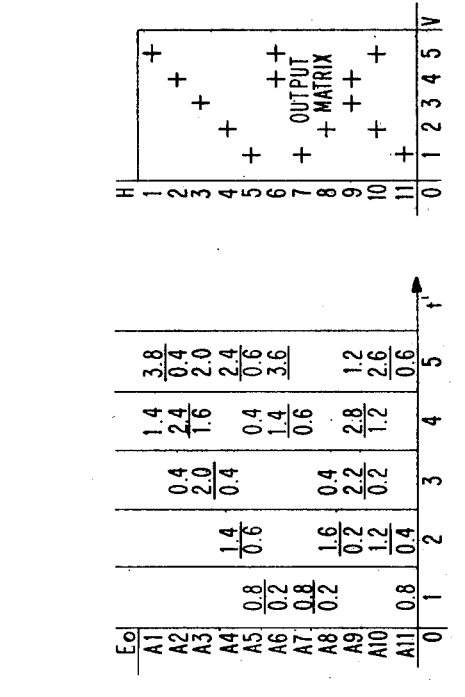
FIG. 21d
FIG. 21c
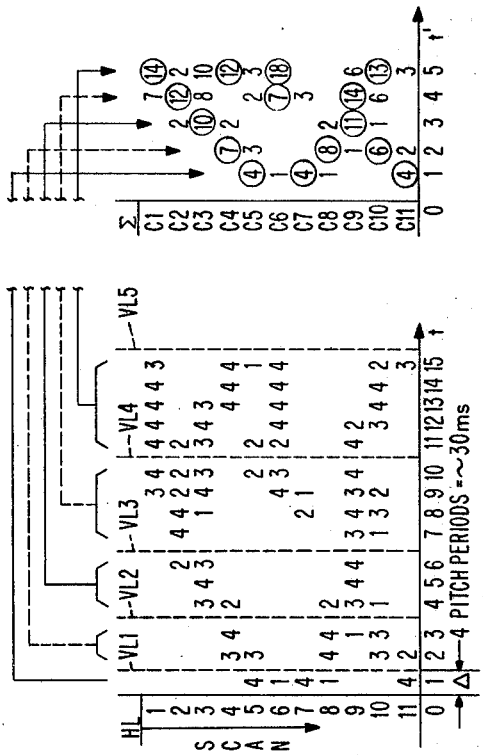
FIG. 21b
FIG. 21a
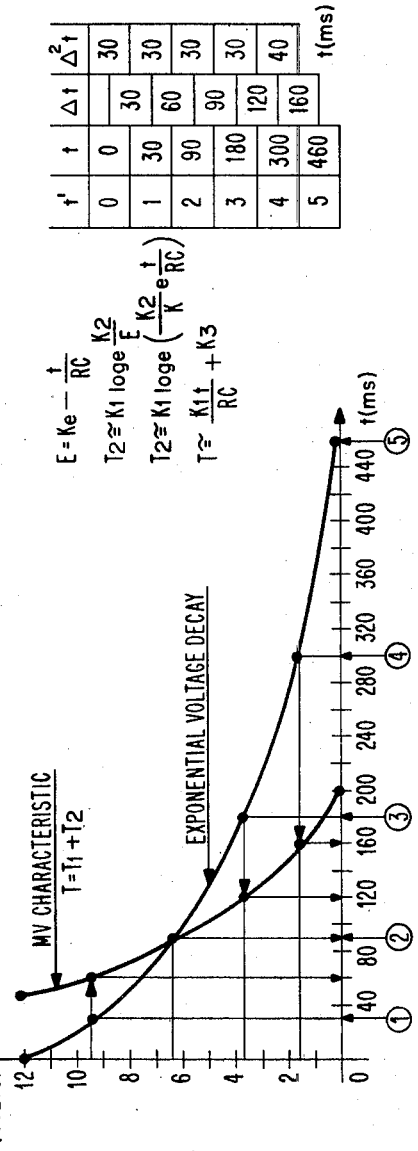
FIG. 22

United States Patent Office 3,499,990
Patented Mar. 10, 1970

3,499,990
SPEECH ANALYZING SYSTEM
Genung L. Clapper, Raleigh, N.C., assignor to International Business Machines Corporation, Armonk, N.Y., a corporation of New York
Filed Sept. 7, 1967, Ser. No. 666,169
Int. Cl. G10l 1/00
U.S. Cl. 179—1                    9 Claims

ABSTRACT OF THE DISCLOSURE

The present invention is concerned with speech analysis and utilizes a system employing a time transformation base of real time to a non-linear time base that essentially compresses information having uncertain time measurements. Formant transitions in speech, for example, tend to occur at widely separate time intervals for word endings but are rather consistent at the beginning of words. The extraction of information representing speech sounds over a linear time base results in an accumulation of information which includes unmeaningful data. The system also utilizes unvoiced sounds as time reference points providing a finer sampling resolution for voiced sounds following the termination of unvoiced consonants. Moreover, the system lends itself to the encoding of fricative and sibilant sounds.

BACKGROUND

Prior art speech analyzing systems utilize encoding means predicated on a linear time measurement and sampling of speech waveforms and provide encoded data which contains considerable redundant information requiring costly storage facilities which render the systems highly uneconomical.

SUMMARY OF THE INVENTION

The present invention is directed to a highly sophisticated speech analyzing system which eliminates the uncertainty that prevails as a result of frequency variations and provides for the storage of more meaningful data by excluding the uncertainties resulting from formant glides. This is achieved mainly by a transformation of the linear time base to a non-linear time base which is unique in that an exponential function operates on a logarithmic function and different portions of the exponential waveform are utilized for expanding or contracting the total time interval and yet maintaining the property of linearly varying time increments. Sophistication in this technique is furthered by employing unvoiced sounds as the basis for time reference points, yielding finer sampling resolution for voiced sounds following the termination of unvoiced sounds.

The principal object of the invention is in the provision of a highly sophisticated voice analyzing system utilizing a novel time transformation technique which results in the encoding of a greater amount of meaningful speech data than was possible by prior art systems.

Another object is to provide a system which eliminates less meaningful speech data to provide greater economy in the coding and storage of the meaningful data.

A specific object resides in the application of a novel technique to the extraction of meaningful speech coded information by employing a non-linear time base in which different portions of an exponential waveform are utilized for expanding or contracting the total time interval yet maintaining the property of a linearly varying time base.

Yet another specific object is the provision of a highly efficient and reliable system by employing unvoiced sounds as the basis for establishing time reference points to yield finer sampling resolutions for the encoding of speech sounds.

The foregoing and other objects, features and advantages of the invention will be apparent from the following more particular description of a preferred embodiment of the invention, as illustrated in the accompanying drawings.

DESCRIPTION OF THE DRAWINGS

FIGS. 2a through 2f are assembled to represent a detailed configuration of the invention.
FIG. 12 shows the details of ring units.
FIG. 13 shows the details of an OR circuit.
FIG. 14 shows the details of an inverter.
FIG. 15 shows the details of a delay switch.
FIG. 18 shows the details of an AND-emitter follower.
FIG. 19 shows the details of a universal pulse generator.
FIG. 20 shows the details of an exponential voltage generator.
FIGS. 21a, 21b, 21c and 21d are a series of plots illustrating the advantages derived from the time transformation concept.
FIG. 22 shows multivibrator characteristics, voltage and time parameters.

Figure 1:
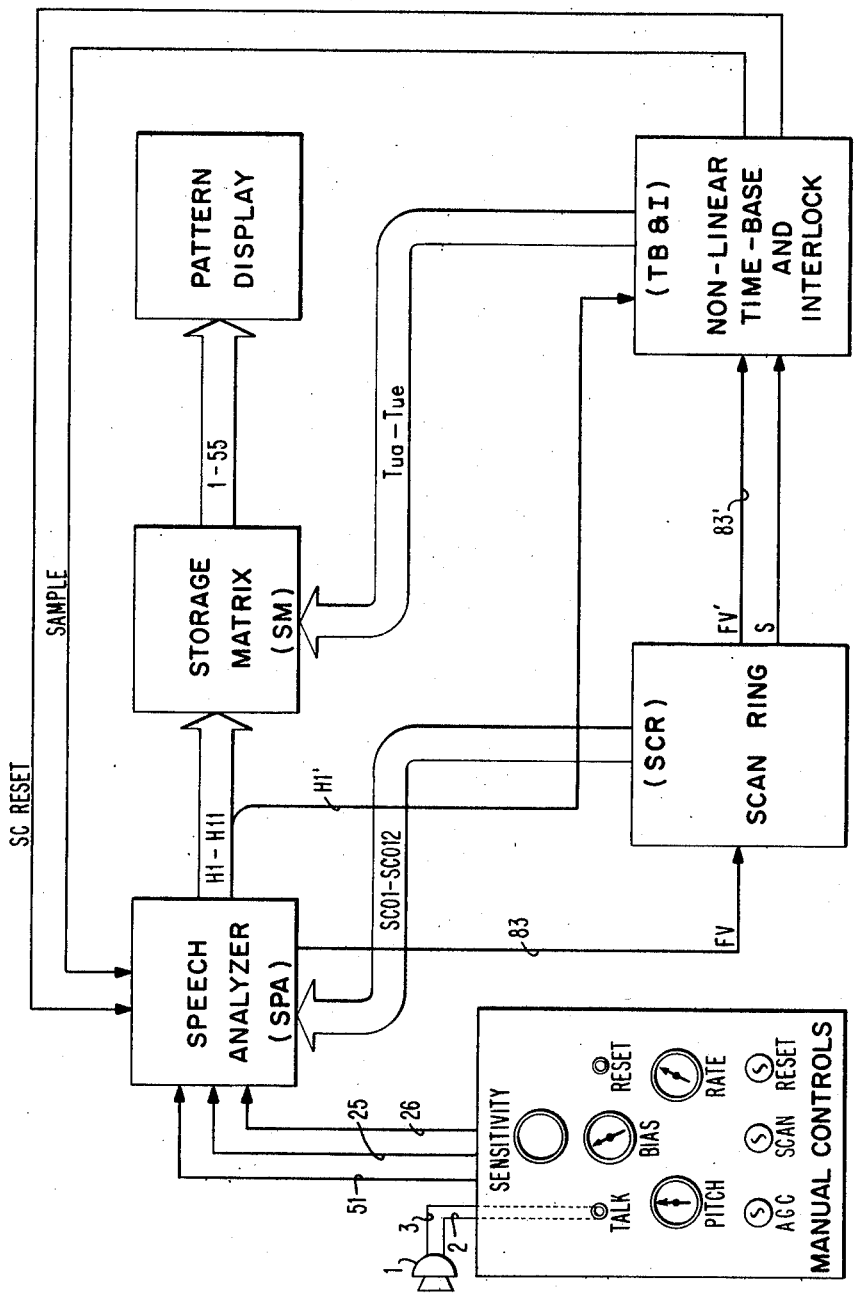
FIG. 1 is an over-all configuration representating the present invention.

In its broadest aspects the system, as seen in FIG. 1, comprises a speech analyzer SPA, a storage matrix SM, a scan ring SCR, a non-linear time base and interlock TB&I, an output pattern display and various manual controls including a microphone 1. To prepare the system for operation, the RESET button is depressed followed by the depression of the TALK button. Speech input is thereafter admitted to the system via microphone 1 which transforms the speech sounds into various waveforms that enter the speech analyzer SPA by way of lines 25, 26 and 51. The speech analyzer under control of scanning signals SCO1–SCO10, issued by scan ring SCR, provide 11 different speech measurements H1–H11 which are suitably coded and passed into the storage matrix SM under control of timing signals TU$a$ through TU$e$ issued by the time base TB&I. The storage matrix is of a well-known coordinate type constituted of the storage matrix latches arranged in columns and rows.

The manner in which the salient features of the invention are performed will be described in detail hereinafter following the detailed descriptions of the important components constituting the invention.

DESCRIPTION OF COMPONENTS

Speech pre-amplifier

Figure 3:
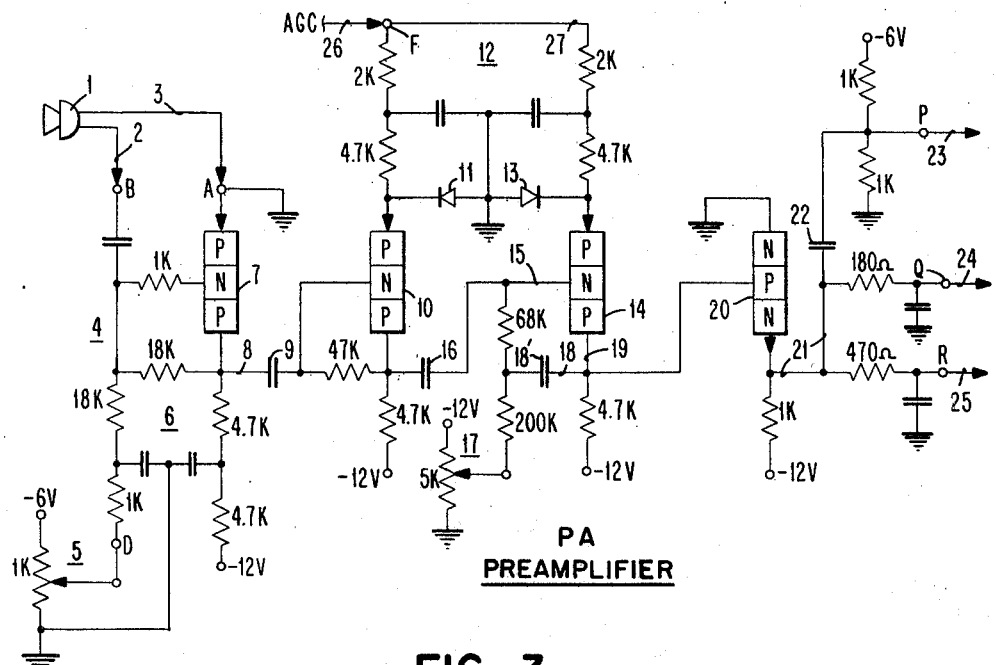
FIG. 3 shows the details of a preamplifier.

The speech pre-amplifier PA, shown in FIG. 3, includes input lines 2 and 3 with the former connected to an RC network 4 terminating with a sensitivity control means 5 in turn connected between ground and a −6 volt supply. Line 3 is connected to the emitter 7$e$ of a transistor 7, the base 7$b$ and collector 7$c$ thereof being resistively coupled to the network 4. The emitter 7$e$ is also connected to ground and the collector 7$c$ is resistively coupled to a −12 volt supply. A grounded capacity network 6 acts as an electrical noise filter to isolate the pre-amplifier first stage. The output of the transistor 7 is coupled by way of line 8 and capacitor 9 to the base 10b of transistor 10. The base 10b is also resistively coupled to collector 10c of the transistor 10. The emitter 10e is connected to ground by way of a diode 11 and also to an RC filter network 12. Similarly, the emitter 14e is connected to ground by way of diode 13 and to network 12. The base 14b of the transistor 14 is capacitively coupled by way of line 15 to the output line 16 extending from the transistor 10. The base via line 15 is resistively coupled to an output level control means 17 connected between ground and a −12 volt supply. This output is also capacitively coupled by way of line 18 which is also connected to an output line 19 extending between the collector output of transistor 14 and the base 20b of transistor 20. The line 18, including capacitor 18′, serves as a degenerative coupling which is effective at low frequencies of about 15 c.p.s. to provide stabilization. Transistor 20 has its collector grounded and the emitter 20e resistively coupled to a −12 volt supply and also to an output network consisting of lines 23, 24 and 25. An automatic gain control signal AGC, line 26 extends from the envelope peak detector EPD and joins the RC network 12 at a point 27, whereby a wider range of control is exercised by virtue of the fact that the AGC signal is impressed across the two successive stages, namely transistors 10 and 14, to provide smoothed outputs for automatic gain control and harmonic analysis. The pre-amplifier PA thus provides, under control of the AGC signal, a high frequency output on line 23 which contains the high frequency noise-like components for operation in the fricative selector; an output on line 24, constituting a middle range of frequencies from 250 cycles per second to 3000 cycles per second for operating the harmonic locator HL; and an output on line 25 which contains only the low frequency components for operating the envelope peak detector EPD.

Fricative selector

Figure 6:
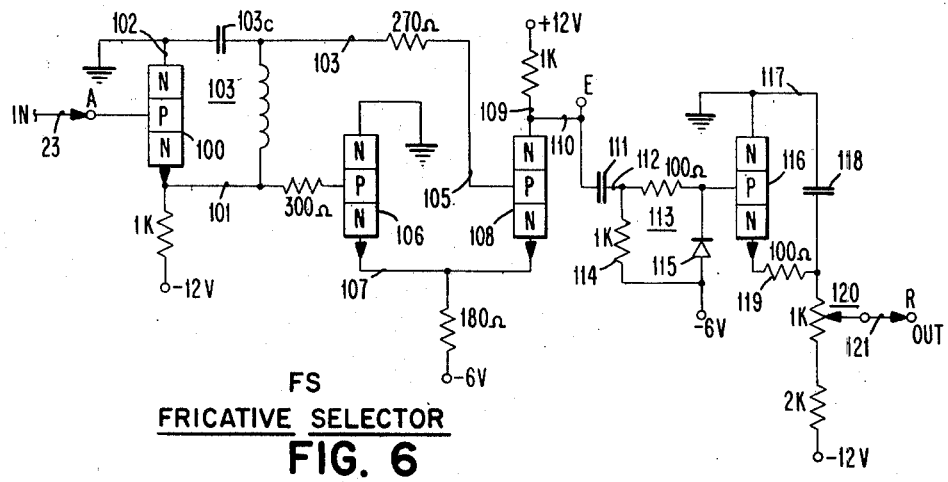
FIG. 6 shows the details of a fricative selector.
Figure 7:
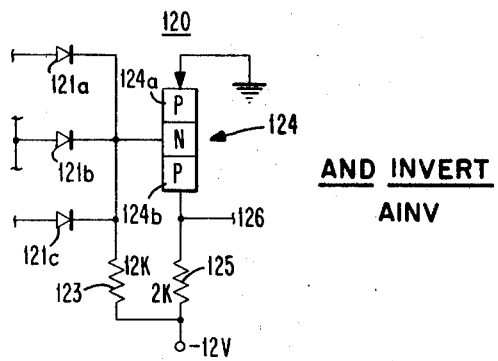
FIG. 7 shows the details of an AND invert.

The fricative selector shown in FIG. 6 comprises essentially three transistors 100, 106 and 108 and an LC network 103. Input signals of high frequency noise-like characteristics are applied by way of line 23, extending from the pre-amplifier PA to the base of transistor 100. The emitter of transistor 100 is resistively coupled to a −12 volt supply and also by way of line 101 to the base of transistor 106. The collector of transistor 100 is coupled to ground and to the base of transistor 108 by way of lines 102 and 103 and a capacitor 103c. The inductor of 2.5 mh. is connected across lines 103 and 101. The emitters of transistors 106 and 108 are connected by line 107 in turn resistively coupled to a −6 volt supply. The collector output of transistor 108 is connected to a +12 volt supply by way of line 109 and also to the base of transistor 116 by way of paths 110 and 112 with a capacitor 111 connected therebetween. Also connected between line 112 and a −6 volt supply is a network 113 which includes a transistor 114 and a diode 115. The emitter of the transistor 116 is resistively coupled by way of line 119 to a potentiometer 120 in turn connected to an output line 121. The collector of the transistor is connected to a grounded line 117 in turn coupled by way of capacitor 118 to the potentiometer 120.

The transistor 100 serves as a driver while transistors 106 and 108 in combination serve as a difference amplifier with the LC network 103 providing a delay. The output from the fricative selector FS, on line 110, consists of high frequency noise-like signals above 4 kc. The rectifying network comprising network 113 and transistor 116 provides a DC level which is proportional to the peak to peak signals presented to the input network 113.

Harmonic locator

Figure 4:
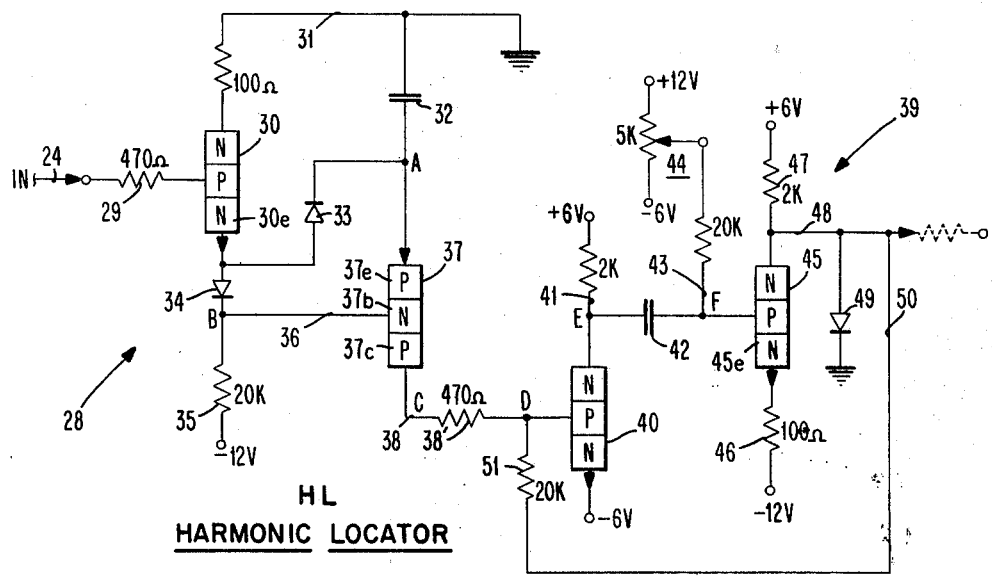
FIG. 4 shows the details of a harmonic locator.

The harmonic locator HL, shown in FIG. 4, comprises a peak locator 28 and a univibrator 39, the former determining points of peak amplitude and the latter standardizing the output pulse. The peak locator 28 includes a pair of transistors 30 and 37 connected in the manner shown. Input to the transistor 30 is from the line 24 through a transistor 29 in turn connected to base 30b of the transistor 30. Collector 30c is coupled to ground by way of a resistor 31 and emitter 37e of transistor 37 interconnected to ground by way of a capacitor 32. The output from emitter 30e is coupled through diode 33 to a point A in the circuit path connected to emitter 37e. The base 37b of transistor 37 is coupled to a point B situated in the path between diode 34 and a resistor 35 terminating at a −12 volt supply. The output from the collector 37c which represents the output of the peak locator 28 extends through a line 38 connected to base 40b of transistor 40 which is the input to the univibrator 39. The transistor 40 has its emitter 40e connected to a −6 volt supply and the collector 40c connected to a +6 volt supply by way of line 41 and a load resistor. From a point E a path 42 including a capacitor 42′ proceeds to the base 45b of a transistor 45. From a point F in this path a width adjustment potentiometer 44 is connected through a line 43. The emitter 45e is connected to a −12 volt supply by way of a line 46, and the collector 45c of the transistor 45 is connected by way of line 47 to a +6 volt supply and to an output line 48 which is grounded by means of a diode 49. A feedback path 50 including a resistor 51 interconnects the output line to the base of transistor 40.

In the operation of the harmonic locator the input speech waveform is limited to a peak to peak amplitude of about two volts. Points of peak amplitude are determined by the novel peak locator circuit combined with a univibrator for output pulse standardizations. On the first large positive peak of the pitch period representing the fundamental excitation, transistor 30 acts as an emitter follower power driver to charge capacitor 32 through the diode 33. This will drive point A to its most positive value, about −2 volts. Simultaneously, transistor 30 drives point B through the diode 34 to the same voltage level. Thus, during positive slopes of the complex waveform, no appreciable voltage difference appears between points A and B, as a result of which transistor 37 does not conduct, points C and D are maintained near −12 volts, transistor 40 is cut off, point E is held at +6 volts and point F at about −12 volts. Current flows from the width adjustment potentiometer 44, through a 20K resistor in the line 43, to the base of transistor 45 to keep this transistor strongly conducting so that the output is held near −12 volts. Under fully loaded conditions, as maximum current flows in the external load, the output in the line 48 may rise to −10 volts.

Assuming the worst condition during the positive charging portion of the first large positive peak, point B will be slightly higher than A since less current flows in diode 33 than in diode 34; thus cutoff of transistor 37 is assured. As the peak is reached, the voltage conditions reverse, since diode 34 is now conducting more current than diode 33; and as the peak is passed, diode 33 is reversely polarized, point B drops below A and transistor 37 conducts. As a result, points C and D are driven rapidly to −6 volts while point C continues to rise slightly above point D as current flows from capacitor 32 through transistor 37 and the series limiting resistor 38′ to the base of transistor 40. This causes a sharp drop in voltage at point E from +6 to −6 volts. This transient is conducted by capacitor 42′ to point F which drops sharply from −10 volts to about −20 volts cutting off previously conducting transistor 45. The resultant positive rise at the output is coupled back through 20K resistor 51 to point D to assure that transistor 40 will remain conducting throughout the full duration of the output pulse. The duration is determined by the RC product of capacitor 42′, the 20K resistor 51 and the setting of potentiometer 44. The pulse width, for the components shown in the network, may be varied from 150 μsec. to 450 μsec.

In general, the termination of the pulse will not cut off the transistor 40, since the negative slope may still keep transistor 37 on, and transistor 40 will stay on until the "valley" is reached after pulse termination. As this point, transistor 30 again begins to charge capacitor 32, transistor 37 cuts off and points C and D drop to cut off transistor 40. Point E now rises to +6 volts, charging capacitor 42' in preparation for the next pulse output. This pulse marks the presence of the most prominent harmonic in the complex speech waveform and its position in time. Separate codes are produced for voiced sounds and this includes vowels and the voiced consonants such as V, Z, etc. Consonants that are unvoiced are not coded by the harmonic locator, these portions of the spoken word being accommodated in the manner described in a co-pending application Ser. No. 474,230, filed July 23, 1965 (now Patent No. 3,395,249).

Envelope peak detector

Figure 5:
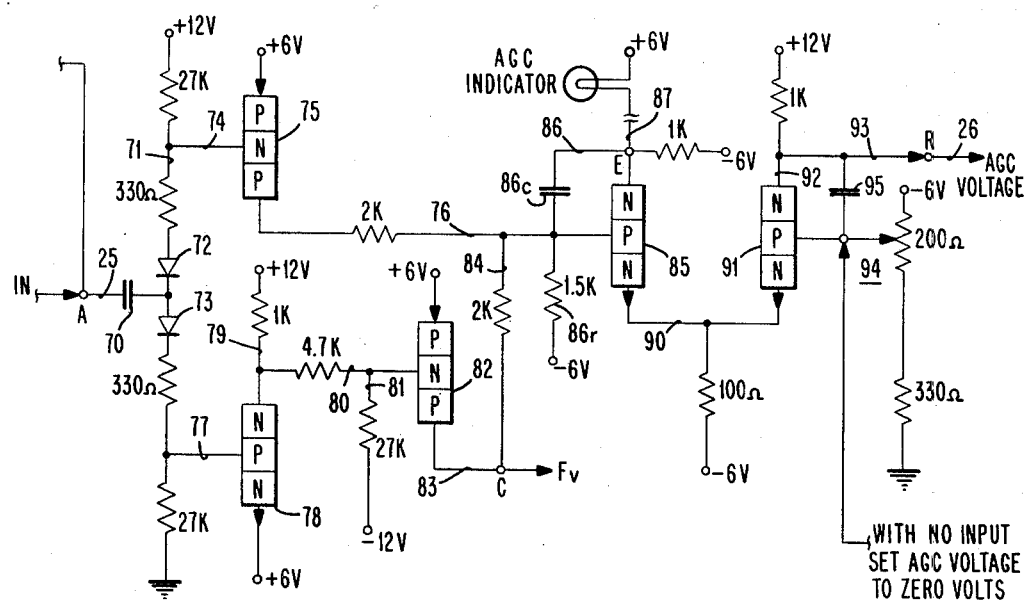
FIG. 5 shows the details of an envelope peak detector.

The envelope peak detector EPD, shown in FIG. 5, comprises essentially three transistors 75, 78 and 82 connected in the manner shown. The incoming signal line 25 is connected by way of a capacitor 70 to a divider network 71 including, among other components, diodes 72 and 73. Input to the base of transistor 75 from the network 71 is by way of a line 74, and input to the base of transistor 78 is by way of a line 77. The emitters of the transistors 75 and 78 are connected each to a +6 volt supply. Output from the collector of transistor 75 is fed to an output line 83 by way of lines 76 and 84. The collector of transistor 78 is connected by way of line 79 to a +12 volt supply and also to the base of transistor 82 by way of a line 80 which is resistively coupled by way of line 81 to a −12 volt supply. The transistor 82 has its emitter connected to a +6 volt supply and the output of the collector is connected to the output line 83.

Transistor 75 is utilized to monitor negative peaks arising during negative voltage excursions of the signals appearing in the network 71, and provides positive signals, through inversion, on the output line 83, by way of lines 76 and 84.

The transistors 78 and 82 monitor the positive peaks, arising during positive excursions, which are impressed on the output line 83. These positive peak voltages thus provide the fundamental frequency which is utilized to control operations of the scan ring SCR and the time base ring TBR.

Transistors 85 and 94 are utilized for the AGC function. Transistor 85 integrates the fundamental frequency by way of the line connection 76 to the base thereof to which is also connected an integrating network 86 which includes a capacitor 86c and a resistor 86r connected to a −6 volt supply. The opposite end of the network 86 is connected to a −6 volt supply, a line 87 including an AGC indicator which terminates at a +6 volt supply, and finally to the collector of transistor 85. The emitter of transistor 85 along with the emitter of transistor 91 are connected by a line 90 in turn resistively coupled to a −6 volt supply. The collector output of transistor 91 is tapped to a +12 volt supply by way of line 92 and to an output line 93 in turn connected to the line 26. The base of transistor 91 is controlled by a potentiometer 94 also coupled to the line 93 by way of a capacitor 95. The transistors 85 and 91 function primarily as an amplifier by which balanced integration is achieved to obtain the proper AGC range to control the pre-amplifier output signals.

Latch ML

Figure 8:
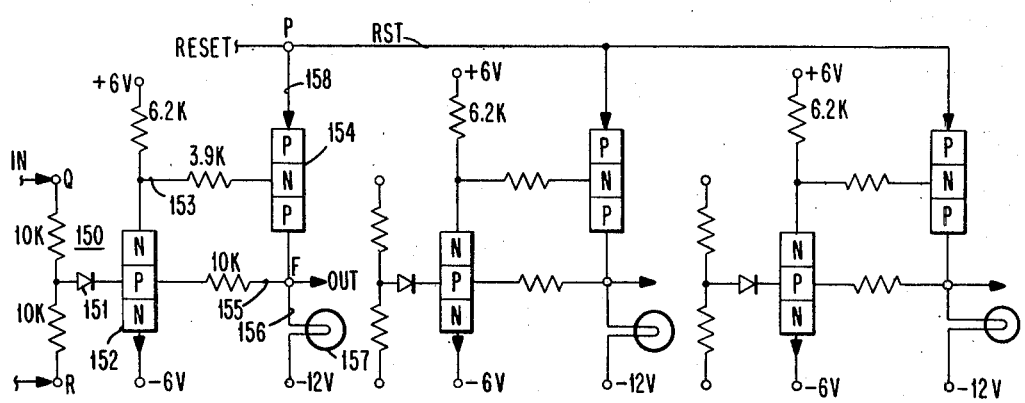
FIG. 8 shows the details of a matrix latch.

The storage matrix SM is constituted of latches ML, ML$\phi$, ML56, a typical one being shown in FIG. 8. Each latch comprises an input coincidence network 150 connected by way of a line 151 to the base of transistor 152 whose emitter terminates at a −6 volt supply, and the collector is resistively coupled to a +6 volt supply. The collector output is resistively coupled by way of line 153 to the base of transistor 154 whose collector is resistively coupled by way of line 155 to the base of transistor 152. A latch indicator 157 is also connected to the collector of transistor 154 by way of the line 156. The emitter of transistor 154 is connected by way of line 158 to a reset line RST.

In the operation of the latch both transistors 152 and 154 are cut off following the application of a reset signal on the line 158. The base of transistor 152 is held below −6 volts by the output from the collector of transistor 154. The latter is held off by a line 153 connected to the collector of transistor 152 which is near +6 volts. If both inputs to the AND circuit are near −12 volts, the base of transistor 152 is also near −12 volts. With one input at −12 volts and one at ground, the latch is maintained at cutoff.

When both inputs are raised to about ground (0 volt), current flows in the base of transistor 152 to turn the latter on. The collector drops and turns on transistor 154 which raises its collector to near ground to cause the indicator lamp to light. The resistive path 155 enables sufficient base current to flow to keep transistor 154 on, even though both inputs should drop to −12 volts. The isolating input diode 151 is backbiased for this condition so that base current does not flow away from the base of transistor 152. Thus, the latch will stay on until reset.

Adjustable delay

Figure 9:
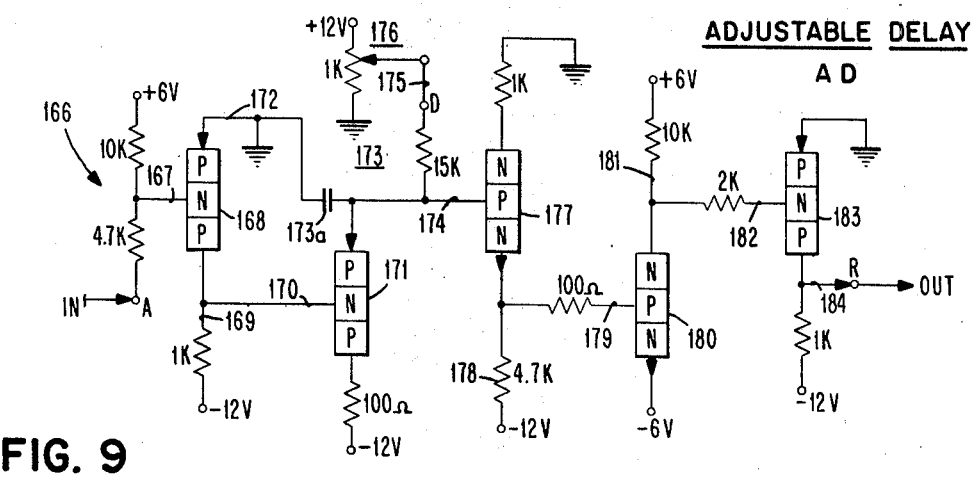
FIG. 9 shows the details of an adjustable delay.

The adjustable delay AD is shown in FIG. 9 and comprises a network which includes five transistors, namely 168, 171, 177, 180 and 183, and an adjustable RC network 173. Incoming signal excursions of approximately 12 volts are presented to an input divider network 166 through a line 167 to the base of transistor 168 which is further coupled to transistor 171 by way of circuit paths 170 and 172. Path 170 interconnects the collector of transistor 168 to the base of transistor 171 and the path 172 includes a capacitor 173a and interconnects the emitters of transistors 168 and 171. The emitter of transistor 171 is connected to the base of transistor 177 by way of a line 174 to which is also tapped the network 173 which includes line 175 and a potentiometer 176. The emitter of transistor 177 is resistively connected to a −12 volt supply by way of a line 178 and also interconnects the base of transistor 180 by way of a resistive line 179. The collector output of transistor 180 extends to a +6 volt supply by way of a resistive line 181 and interconnects the base of transistor 183 by way of a resistive path 182. The collector of transistor 183 is resistively connected to a −12 volt supply and the collector output is impressed on output line 184.

In operation, when the incoming signal level drops from zero volts to −12 volts, transistor 168 conducts and charges capacitor 173a which forms a part of the network 173. The charging of the capacitor causes a delayed rise from −12 volts to −6 volts at the emitter output of transistor 171. This delayed rise is passed on through the emitter follower transistor 177 and, in combination with transistors 180 and 183, provides a delayed square wave output on the line 184. This delayed square wave output is utilized to complete the scan signal of the scan ring SCR by storing the end of the S8 pulse from the last stage of the ring for a period of about 3 ms. before turning on the initial stage S$\phi$. This delays the turning off of the gated multivibrator GMV and also prevents spurious ring starts which would be occasioned by noise transients passing through the envelope peak detector EPD.

Gated multivibrator

Figure 10:
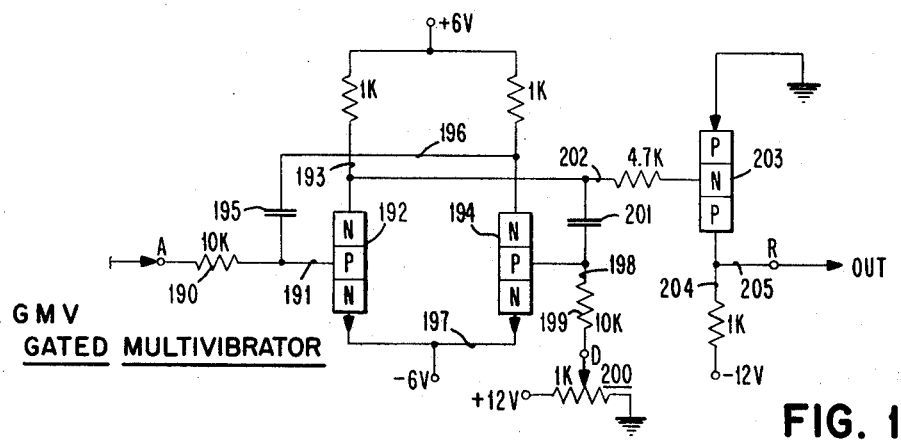
FIG. 10 shows the details of a gated multivibrator.

The gated multivibrator GMV shown in FIG. 10 comprises essentially three transistors 192, 194, 203, an RC network, a rate control potentiometer 200, all of which are connected in the manner shown. Incoming gating signals are fed across a gating resistor 190 through line 191 to the base of transistor 192 whose emitter is interconnected with the emitter of transistor 194 by way of line 197 which is connected to a −6 volt supply. The collectors of transistors 192 and 194 are resistively intercoupled by way of line 193 also connected to a +6 volt supply. The collector of 194 is cross coupled to the base of transistor 192 by way of a line 196 and a charging capacitor 195. The collector of transistor 192 is resistively coupled by way of line 202 to transistor 203 and capacitively coupled to the base of transistor 194. Also connected to the base of transistor 194 is an RC network 198 which includes a capacitor 201, resistor 199 and the rate control potentiometer 200. The emitter of transistor 203 is grounded and the collector is resistively coupled to a −12 volt supply by way of a line 204. The collector output passes through output line 205.

In the operation of the multivibrator GMV, a gate signal, when raised from a −12 volt level to ground, is passed through the gating resistor 190 to charge capacitor 195 and after a brief delay, depending upon the time constant of this RC combination, the transistor 192 is driven into conduction and the transistor 194 is cut off, as a result of which transistor 203 is driven into conduction to provide an output on the line 205. Multivibrator action continues between the transistors 192 and 194 as each alternately conducts and the action continues so long as the input gate signal is up; dropping this gate signal to −12 volts terminates the multivibrator action. The frequency of the multivibrator action is under the control of the RC network 198 and the setting of the rate control potentiometer 200.

Ring drive

Figure 11:
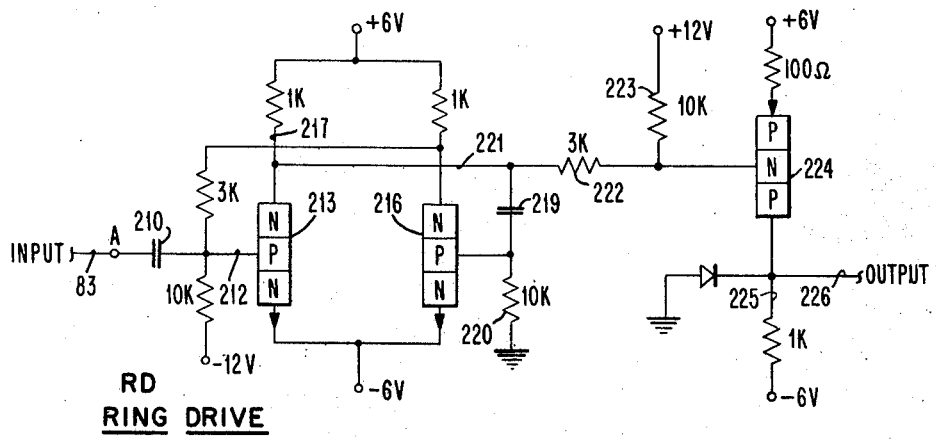
FIG. 11 shows the details of a ring drive.

The ring drive RD, shown in FIG. 11, comprises transistors 213, 216 and 224 connected in the network shown. Input timing signals enter the ring drive by way of a capacitor 210, line 212 to the base of transistor 213 whose emitter is connected to a −6 volt supply, and the collector to +6 volts by way of a resistor 217. Transistor 216 has its base connected to the collector of transistor 213 by way of a coupling capacitor 219 and also to ground by way of a 10K resistor 220. The collector output of transistor 213 is fed into the base of transistor 224 by way of a line 221 and a resistor 222. A +12 volt supply is connected to the base of transistor 224 by way of resistor 223. The emitter of transistor 224 is resistively connected to a +6 volt supply and the collector to a −6 volt supply. The collector is clamped to ground by the diode. The collector output is passed on to line 226 which is connected to the open ring drive line 505, in the case of driver RD2, and line 83′ in the case of RD1.

Figure 2:
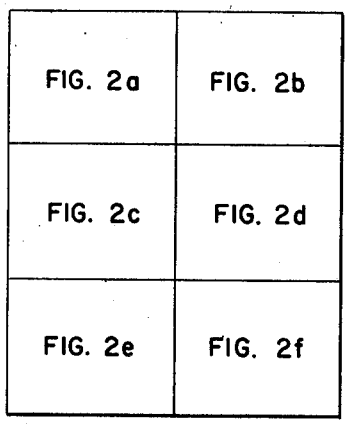
FIG. 2 shows how

In operation, the signals enter the ring drive by way of the capacitor 210. Transistors 213 and 216, in conjunction with the capacitor 219 and resistor 220, function as a pulse generator to produce pulses of definite length, the length being dependent upon the time constant of the resistor 220 and the capacitor 219. The purpose of the transistor 224 is to provide drive as well as a shift in the pulse level. The output pulse from the instant circuit varies between ground and +6 volts and has a pulse period of approximately 130 μsec. The ring drive associated with the time base ring in FIG. 2f is referenced RD3.

An OR configuration 260 is shown in FIG. 13. The presence of a signal on either or both of two inputs 261 and 262 provides an output on line 263.

A delay switch DS shown in FIG. 15 comprises a transistor 280 having a grounded emitter and an RC network 281 connected to the base of transistor 280. The RC network includes a capacitor 282 and resistor 284a. A relay coil 285 is connected from −12 volts to the collector of transistor 280. A power turn-on switch PSW is interposed between the capacitor 282 and a power supply which supplies appropriate voltages to provide a time delay of at least a second or more. The PSW switch, when closed, causes the coil 285 to energize and close associated contacts 285 following a delay determined by the time constant of the delay switch. This provides an output to reset the matrix latches by way of reset line RST.

Inverter

The inverter 370 (INV) is used to produce a complement or inverted output which has the opposite condition to the input. Referring to FIG. 14, when the input is ON, at 0 volt, the output is OFF at −12 volts, and when the input is OFF, at −12 volts, the output is ON at 0 volt. The input signal is applied to terminal 371. When the signal is at 0 volt, current flows from +6 volts through resistors 373 and 372 in series to terminal 371 at 0 volt, so that the base of PNP transistor 375 connected to the junction of the resistors will be at a voltage higher than 0 volt and the transistor is cut off. With this input condition, no current flows in line 376 to resistor 377 and terminal 378 will be at −12 volts for the no-load condition.

On the other hand, when the input signal is at −12 volts, the line 374 would be well below 0 volt were it not for current flowing from ground through the emitter and the base of transistor 375. This current puts the transistor into heavy conduction and the output terminal is raised to 0 volt as current flows from line 376 to the load and through resistor 377 to −12 volts.

Ring units

The ring unit, shown in FIG. 12, is constituted of a plurality of two-stage units RU0–RU9. A stage is turned on only when the previous stage has been on for some time and a ring drive pulse turns the stage on with no overriding conditions or pulse races. D.C. feedback is used to turn off the preceding stage. The ring is immune to noise and responds well to start-stop operation.

Two ring positions are shown so that an explanation of the relation of one unit to the other may be facilitated.

During a reset, all units are turned off so that the outputs 499, 516, etc., are at or near −12 volts. It will then be required to set one position, usually the first stage, to an ON state. This may be done immediately after the resetting operation or at a later time. This unit has been designed so that a negative pulse, from 0 to −12 volts, performs the RESET operation and the end of the pulse may be used to SET stage 1 ON. When the input signal at terminal 470 goes negative, from 0 volt to −12 volts, junction 472 is driven below the −12 volts potential, the initial value due to the effects of resistor 473. During the negative pulse, however, it is quickly restored to −12 volts by current flowing in diode 477 through junction 476, resistor 474 to junction 472. When the SET input 470 rises from −12 to 0 volt, junction 472 is driven positive from −12 volts to about 0 volt. Current now flows from junction 472 through resistor 474 to junction 476 and thence through diode 475, junction 478, and line 479 to the base of transistor 480. Current also flows through resistor 481 to junction 482 which is held at nearly −12 volts by conduction through transistor 484. The current flowing from junction 482 to the −12 volt supply proceeds along two paths. One path extends from junction 482 through the emitter-base diode of transistor 484 to junction 486 through resistor 487 to the −12 volt supply. The other path extends through junction 482 through the conducting PNP transistor 484 through resistor 488 to the −12 volt supply. When junction 478 reaches about −6 volts, current begins to flow in the base-emitter diode of transistor 480 to −6 volts to turn the transistor on and cause current to flow from +6 volt supply through resistor 489, through junction 490, resistor 491, junction 492, resistor 493, conducting transistor 480 to the −6 volt supply. The drop across resistor 489 causes junction 490 to drop below 0 volt, whereupon current flows from Reset line 495 to junction 496, line 497 to the emitter of transistor 485, the emitter-base diode of the transistor, junction 490, resistor 491, junction 492, resistor 493, transistor 480 to the —6 volt supply. This causes transistor 485 to conduct current flow from the Reset line 495 through junction 496, line 497, conducting transistor 485, line 486', terminal 486, resistor 487 to the —12 volt supply. The drop across resistor 487 causes junction 486 connected to the base of transistor 484 to rise above its emitter connected to junction 482 to cut off the transistor so that it will not resist the drive-on action of transistor 485. Current flow from the transistor passes through diode 483 to raise junction 482 and output terminal 499 to near zero volts. Current also flows through resistor 481 to the base of transistor 480 to keep the latter conducting. This, in turn, keeps transistor 485 conducting so that the ring stage one is latched ON, the drop across conducting diode 483 assuring that junction 486 remains at a higher potential than junction 482 to maintain transistor 484 in a cutoff state.

Since the output terminal 499 has now risen to 0 volt, a gating action takes place for the second ring stage to cause current flow through resistor 501 to junction 502, capacitor 503, line 504 to ring drive line 505. This charges capacitor 503 until the voltage at junction 502 rises to about —8 volts. At this time the current flowing away from junction 502 through diode 508, the base of transistor 509, resistor 510 to junction 511, conducting transistor 512, resistor 513 to a —12 volt supply, equals the current flowing into junction 502 from the output line 499 through resistor 501. Thus, a state of equilibrium exists with transistor 509 at cutoff, so that position 2 is still off, even though gated by position 1.

When a positive going ring drive pulse appears on the line 505, a turn-on action is transmitted by way of line 504 through capacitor 503 to junction 502 which attempts to rise above —6 volts from the original —8 volt level. As junction 502 reaches —6 volts, current flows in diode 508 to the base-emitter diode of transistor 509 turning it on. As a result, the positive bias on transistor 515 is removed by current flowing into conducting transistor 509 through resistors 519, 521 and 523. When transistor 515 conducts, a positive bias is applied to transistor 512, cutting the later off so that it raises junction 511 and output line 499 from near —12 volts to 0 volt. Current flowing from junction 511 through resistor 510 maintains transistor 509 in conduction and also keeps transistor 515 on, so that ring stage 2 is latched on.

The rise at output line 516 is conducted via line 517 back to diode 518 which conducts and raises junction 492 to near 0 volt even though transistor 480 is conducting inasmuch as a voltage drop of about 6 volts builds up across resistor 493. When junction 492 rises, current is reduced in the resistors 521 and 519 so that junction 520 rises above ground (0 volt) and transistor 485 cuts off. This drops junction 482 and output line 499 and places a negative bias on the base of transistor 480 through resistor 481. Thus, transistors 485 and 480 resume their cutoff states and transistor 484 reverts to conduction. Base current now flows in transistor 484 from junction 482 to the emitter-base diode of transistor 484, junction 486, and through resistor 487 to the —12 volt supply. This causes an amplified current to flow from output line 499 through junction 482 to conducting transistor 484, resistor 488, to the —12 volt supply to maintain the output line 499 at its off level.

The rise at output line 516 will gate on ring stage 3 so that the following ring drive pulse will energize stage 3, whereupon transistor 515 turns off through diode 518 in the manner described for stage 1. Thus each unit gates on the succeeding unit, which comes on with the occurrence of a ring drive pulse and turns off the preceeding stage via the feedback connection.

In the case of a "closed ring," the final stage output becomes the input gate for stage 1. The rise at the input line 525 causes current to flow through resistor 526 to junction 527 to charge capacitor 528. The next ring drive pulse on line 505 is passed by capacitor 528 to junction 527 to turn on transistor 480 as current flows through diode 529 to junction 478 to the base of transistor 480. Thus, a new ring cycle is started and the ring stages will turn on and off in succession in the manner described.

Scan counter

Figure 16:
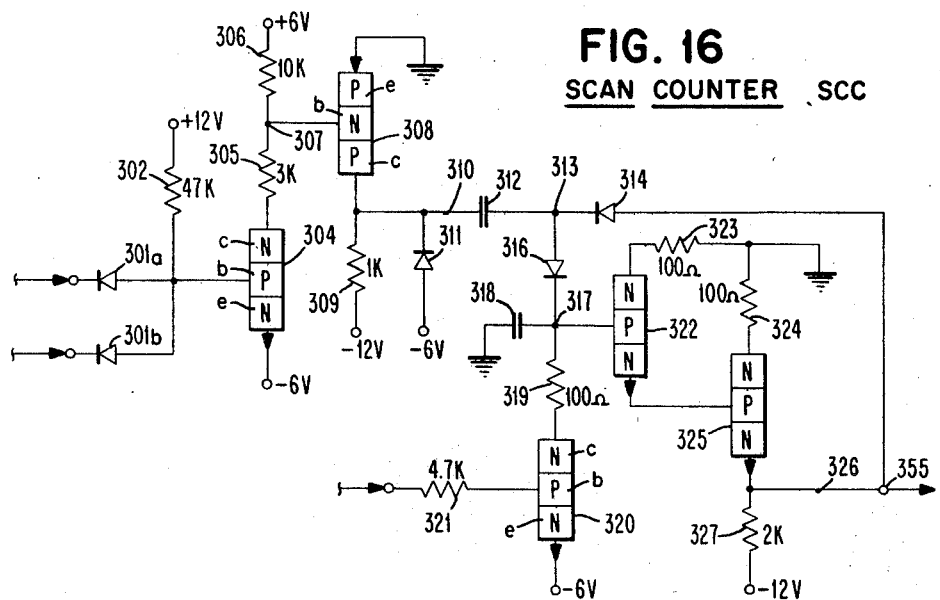
FIG. 16 shows the details of a scan counter.

The scan counter, shown in FIG. 16, is used to count the output pulses from the harmonic locator during a given scan interval. During scanning, the scan ring generates successive pulses on the input diode 301a and the harmonic locator provides pulses to input diode 301b. The NPN transistor 304 is normally biased off as the base 304b is held below the —6 volt reference at the emitter 304e by current flowing in either input diode. When a coincidence of positive pulses occurs at the inputs, both diodes are back-biased and current flows from the +12 volt supply through resistor 302 into the base 304b and thence to the emitter 304e and the —6 volt supply. This causes transistor 304 to conduct and current flows from the +6 volt supply through resistors 306 and 305, lowering the potential at intersection 307 until PNP transistor 308 conducts. The result of the double inversion is a well-shaped squarewave pulse on line 310 from —6 volts to 0 volt. Line 310 is clamped to —6 volts by diode 311 as current normally flows from —6 volts through diode 311 to line 310 and through resistor 309 to —12 volts. When transistor 308 conducts, line 310 rises sharply to 0 volt, reversely biasing diode 311. At the end of the input coincidence, NPN transistor 304 cuts off as one or both inputs drop to an off level below —6 volts. The resultant positive rise at junction 307 cuts off PNP transistor 308 as the base 308b rises above the emitter 308e which is referenced to ground. Line 310 then falls to —6 volts where it is held by clamp diode 311.

The six volt positive pulses formed by the double inversion of the input coincidence are coupled to intersection 313 by capacitor 312. This is the input to a "well-and-bucket" circuit, well known in the art, wherein increments of charge on a small capacitor are transferred to a larger capacitor so that a counting effect is achieved. In this circuit, the charge on capacitor 312 is conducted through diode 316 to one side of capacitor 318, the other side of 318 being referenced to ground potential. The transfer of charge takes place on the positive transient and when the negative transient from 0 to —6 volts occurs on line 310, intersection 313 tries to fall, but this is prevented by current flowing through diode 314 from the output terminal 355. This terminal had just risen by one incremental step by reason of increased conduction in transistors 322 and 325. The small step in voltage at intersection 317 causes a small increase in current flowing from ground through resistor 323 and transistor 322 to the base of transistor 325 which in turn increases the current flowing from ground through resistor 324 and transistor 325. Thus the drop across resistor 327 increases by essentially the same amount as the increase in voltage on capacitor 318 and the junction 326 and the rise on output line 355. This in turn causes intersection 313 to be held to a voltage higher than before the input pulse began. The next input pulse drives the same amount of current as before through diode 316 as the incremental charge on capacitor 312 transfers to capacitor 318. Each input coincidence raises the output terminal through about 0.15 volt. After 20 pulses the output rises about 3.0 volts, and after 30 pulses about 4.5 volts, and so on. When the output has been utilized, the counter is reset. A pulse applied through resistor 321 causes NPN transistor 320 to conduct as current flows through the limiting resistor 321 to the base 320b and out of 320e to the —6 volt supply. This causes heavy current to flow in resistor 319 to quickly discharge capacitor 318 and prepare the Scan Counter for a new counting cycle.

Interlocked balance units

Figure 17:
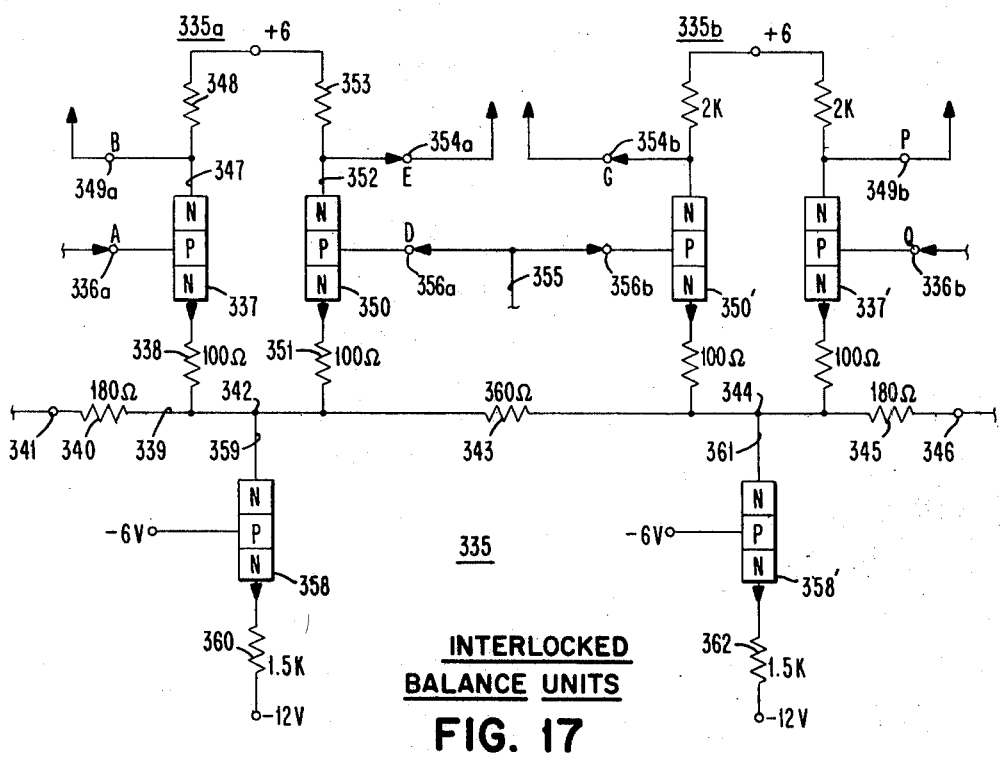
FIG. 17 shows the detail of an interlocked balance unit.

Referring to FIG. 17, a pair of interlocked balance units 335 consists of similar circuit configurations 335a and 335b and represent the same relationship between all adjacent pairs of interlocked balance units in the speech analyzer. The balance units are somewhat similar to those described in U.S. Patent 3,296,374 in which a form of hysteresis provided by a low impedance resistor coupling network. The present arrangement affords greater precision in locating the local maxima in the frequency spectrum by mitigating the effects of noise.

Resistor 343 of 360 ohms connects junctions 342 and 344. Resistor 340 of 180 ohms combines with another 180 ohms resistor in an adjacent unit, not shown, to provide a resistance of 360 ohms. Similarly, resistor 345 connects with its counterpart in an adjacent unit. Line 355 is connected to transistor 350 and 350' via terminal connections 356a and 356b, respectively. Outputs 354a and 354b from adjacent balance units are paired and serve as inputs to AND invert circuits shown in FIG. 2b.

To illustrate the operation of the balance unit, consider the input on line 355 to be greater than the inputs connected to either of terminals 336a or 336b.

Since the emitter junctions 342 and 344 follow the higher input of the transistor pairs 337, 350 and 350', 337', the voltage at junctions 342 and 344 will be equal and just slightly below the voltage at the input terminals 356a and 356b connected to line 355. Since this state of conditions is assumed to represent a local maximum, neighboring junctions influenced by similar voltages at 336a and 336b, respectively, are lower in voltage to enable current flow to these junctions through resistors 340 and 345, respectively, and no current flowing through resistor 343 at this time. However, the current flowing away from junctions 342 and 344 via resistors 340 and 345, respectively, adds to current flowing in the constant current generators, namely transistors 358 and 358', to provide an increase in the negative signals on output terminals 354a and 354b. Similarly current flowing into the adjacent junctions subtracts from the current available to these latter junctions to lower the swing and effectively reduce the gain of the stages adjacent the stages representing the local maxima. The sensitivity for detecting the local maxima sensing action is thereby increased while the "valleys" are desensitized whereby noise and jitter effects are reduced.

In the case where the voltage on line 355 is lower than that on the corresponding inputs connected to terminals 336a and 336b in adjacent balance units, current will not flow through the resistor 343 when the voltage at terminal 336a is equal to the voltage at terminal 336b. In general, this condition will not prevail since some current will flow to the junction which is lower in voltage. The fact that current flows into both junctions 342 and 344 from interconnecting resistor network terminals 341 and 346 via resistors 340 and 345, respectively, subtracts from the net current flow provided by the constant current generators (358 and 358') to desensitize the units adjacent the one representing the local maximum. Resistors 338 and 351 in the emitter circuits are degenerative and oppose the hysteresis action, especially for high input signal differences.

AND-Emitter Follower

The AND-Emitter Follower 385, shown in FIG. 18, consists of a three-input logical AND coupled to a "push-pull" emitter follower. A coincidence of positive input signals causes a positive output. If any input terminal is at a lower level than the others, the output will be substantially at this same low level.

Consider first the condition of a positive coincidence of input signals. Input terminals 386a, 386b, and 386c are all at, or near, 0 volt, so that the intersection 387 will also be very near 0 volt. Current flows from the +6 volt source through resistor 388, intersection 387, and line 389 to the base of transistor 390. Base current amplified by the current-gain of the transistor causes collector current to flow from ground through the resistor 391 and through the NPN transistor 390 to the emitter. Current passes via line 392 through diode 394 to output terminal 395 to about 0 volt. Some current also flows from line 392 through resistor 393 to the −12 volt source. The drop across resistor 393 will cause the base of PNP transistor 396 to be slightly higher than its emitter which is connected to the output terminal 395 by line 397. This slight voltage difference is equal to the drop across conducting diode 394 and is about 0.4 volt. This is sufficient to assure that transistor 396 is cut off and therefore does not add to the load.

When one or more inputs are at a lower level near −12 volts, current flows through one or more diodes to the low inputs, causing a greater drop across resistor 388 to the +6 volt source and lowering the intersection 387 to near −12 volts. This drops the base of NPN transistor 390 to this level via connecting line 389 and reduces the current to a very small value. The emitter of transistor 390 follows as the drop across resistor 393 is reduced. Through line 398 the base of PNP transistor 396 is also driven negatively so that current flows from output terminal 395 via line 397 to the emitter of transistor 396, through the conducting transistor to the collector and through the resistor 399 to the −12 volt source as current is abstracted from the load.

Universal pulse generator

The universal pulse generator, FIG. 19, accepts positive or negative transients at any voltage level and produces positive and negative pulses at two different operating levels. Push-pull inverters are used to drive the outputs so that a variety of loading conditions may be handled. The inverters are coupled together by an R-C network that determines the pulse width.

A positive going transient applied to input terminal 406 initiates a pulse generating action. Negative transients on this input terminal are ineffective to operate transistor 410. Negative pulses are clamped to −12 volts, however, to hasten the recovery of the circuit. Diode 408a performs the clamping action in series with current limiting resistor 408c. Biasing resistor 408d normally holds line 409 to the base of transistor 410 at about −12 volts which keeps the NPN transistor 410 in a state of cutoff. A positive input transient applied to input terminal 406 is coupled through capacitor 407 and diode 408b to line 409, raising it from −12 volts to slightly above −6 volts where it is held by the clamping action of the base-emitter diode of transistor 410. When base current flows, an amplified collector current in transistor 410 drops line 411 as current flows in resistor 412 cutting off transistor 414 through line 413 connected to the base of transistor 414. Thus, transistor 414 does not add to the load and substantially all of the current is available to drop line 416 to the output load. Current from the load flows through line 416, diode 417 and transistor 410 to −6 volts, dropping the output line 416 rapidly from +6 volts to −6 volts. As the output line 416 drops to −6 volts, current flows from ground through transistor 425 emitter-base diode, line 424, resistor 419 and line 418 to the junction of lines 408 and line 416. This turns on transistor 425 which had been previously cut off and causes current to flow in line 426 and resistor 427 to −12 volts. The attendant rise in voltage on line 426 cuts off transistor 430 so that it does not interfere with the generation of a positive output pulse. As transistor 425 conducts, current flows through diode 428 to line 429 producing a sharp voltage rise from −12 volts to 0 volt.

The positive transient on output line 429 is coupled through capacitor 434 to line 436. Capacitor 435 may be connected external to the circuit to allow for long pulses requiring large capacitors. The rise in voltage on line 436 is coupled through resistor 433 and line 432 to the base of transistor 410 to aid and maintain the original positive going transient that initiated the pulse generating action. Eventually capacitor 434 discharges to the point where the current flowing to transistor 410 base is insufficient to maintain conduction and pulse generating action is terminated. Transistor 410 cuts off as current flows to −12 volts from line 409 through resistor 408d. The resultant rise on line 411, caused by the decreased drop across resistor 412 to +6 volts, puts transistor 414 into conduction as line 413 rises above line 416. The output on line 416 follows and rises from −6 volts to +6 volts. This rise is transmitted via line 418 through resistor 419 to line 424 connected to the base of transistor 425, cutting off the current flow from ground to line 426 and resistor 427 that held transistor 430 at cutoff. When line 426 drops as a result of decreased current in resistor 427, base current flows from output line 429 through the emitter-base junction of transistor 430 to line 426 through resistor 427 to a −12 volt source. Increased current now flows from the output line 429 through transistor 430 and resistor 431 to the −12 volt source. This pulls down the output line 429 from 0 volt to near −12 volts to cause a negative transient to pass through capacitor 434 and resistor 433 to the base of transistor 410 to complete the pulse terminating action. Transistors 410 and 425 are now fully cut off and transistors 414 and 430 are fully conducting to maintain the output lines in the original state existing prior to the pulse forming action.

A negative transient on input terminal 423 may also initiate a pulse forming action. A drop in voltage at terminal 423 of at least six volts is coupled through capacitor 422 and diode 421a to junction 420 which is at +6 volts prior to the input transient. Junction 420 is coupled via line 424 to the base of a PNP transistor 425 which is caused to conduct by a negative input. Positive inputs are not effective and clamp diode 421b and series resistor 421c perform the function of quickly restoring circuit conditions to normal following a positive transient.

The pulse forming action for a negative transient is similar to that described above for a positive transient except for the sequence of transistor actions.

A negative pulse on line 424 turns on transistor 425 which cuts off transistor 430 allowing transistor 425 to drive output line 429 from −12 to 0 volt. This positive transient is coupled through timing capacitor 434 to line 436 and through resistor 433 and line 432 to turn on transistor 410. This cuts off transistor 414 causing a negative change on the output line 416 from +6 to −6 volts. By way of line 418 and resistor 419 the original negative change is maintained at junction 420 until capacitor 434 discharges, whereupon transistor 410 cuts off, transistor 414 turns on, transistor 425 turns off and transistor 430 turns on to restore the output lines to their normal quiescent operating levels, namely +6 volts for line 416 and −12 volts for line 429.

Exponential voltage generator

The exponential voltage generator EVG, shown in FIG. 20, utilizes the well-known principle that a capacitor charges through a fixed resistor exponentially as a function of time. A positive input condition on terminal 451 causes current to flow into the base of transistor 452 which turns it on so that collector 453 drops from +12 volts to −6 volts. Current now flows in the base circuit of transistor 457 from a +6 volt source through the emitter-base diode of the PNP transistor 457, line 456, resistor 454, collector connection 453, conducting transistor 452, and a −6 volt supply. When transistor 457 turns on, it forms a low impedance path around capacitor 458 to discharge through the +6 volt supply, through conducting transistor 457, resistor 459, junction 460, capacitor 458 to the +6 volt supply. Junction 460 rises to substantially +6 volts as the capacitor 458 is discharged. Line 463 and series emitter followers formed by transistors 464 and 465, maintain the output line 469 at about +6 volts. Since the current multiplication for series emitter followers is the product of the gains of the individual transistors, only a very small current is abstracted from the timing circuit by the output load.

When the input goes negative, the exponential voltage drop starts. As the input terminal 451 drops below −6 volts, transistor 452 cuts off, line 453 rises, current ceases to flow in resistors 454 and 455 and line 456 rises toward +12 volts cutting off transistor 457 which has been shorting capacitor 458 thereby holding it in a discharged condition. Capacitor 458 now begins to charge through resistor 461 connected to an adjustable voltage source formed by potentiometer 462 that permits the charging rate to be varied as desired. As the capacitor charges, junction 460 drops slowly from +6 volts toward the voltage set by the potentiometer, which may be set at about −9 volts, for example. The drop at the output follows the drop at junction 460 since the junction connects to the base of PNP transistor 464 via line 463 and the emitter of transistor 464 follows as current flows from +12 volts through resistor 468, transistor 465 emitter-base diode, transistor 464, resistor 466 to the −6 volt supply. As the emitter of transistor 464 drops, it causes transistor 465 to increase conduction which increases the drop across resistor 468 as amplified current flows from the +12 volt source through resistor 468, transistor 465, resistor 467 to the −6 volt supply. Thus, line 469 falls in synchronous relationship to the falling voltage at junction 460. The exponential fall continues until transistor 465 saturates when the output line 469 approaches −6 volts. When the input level rises above ground, transistors 452 and 457 conduct, capacitor 458 is discharged, junction 460 rises to +6 volts and the output line 469 follows. This restores the circuit in preparation for another exponential voltage drop when the input again goes negative.

OPERATION OF INVENTION

Figure 2A:
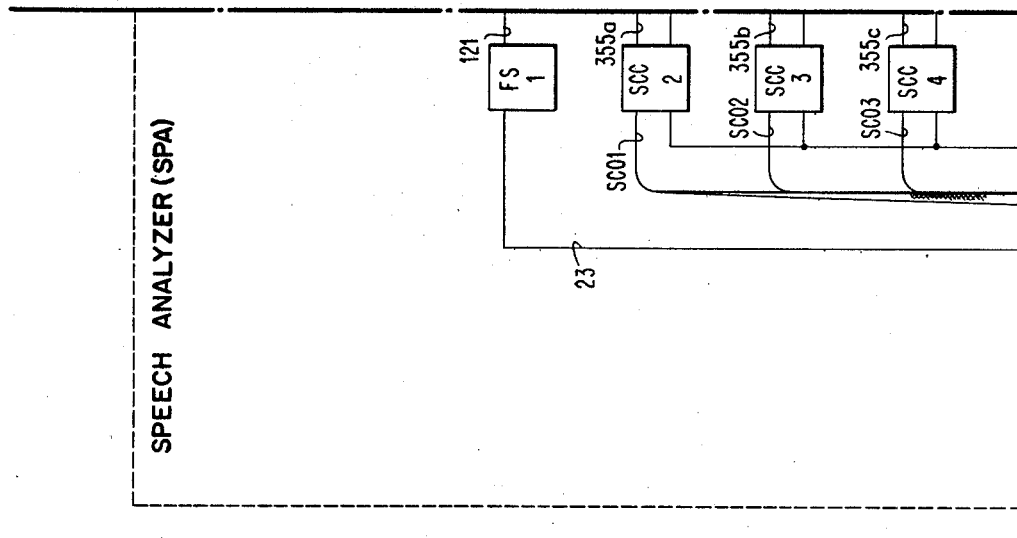
Figure 2B:
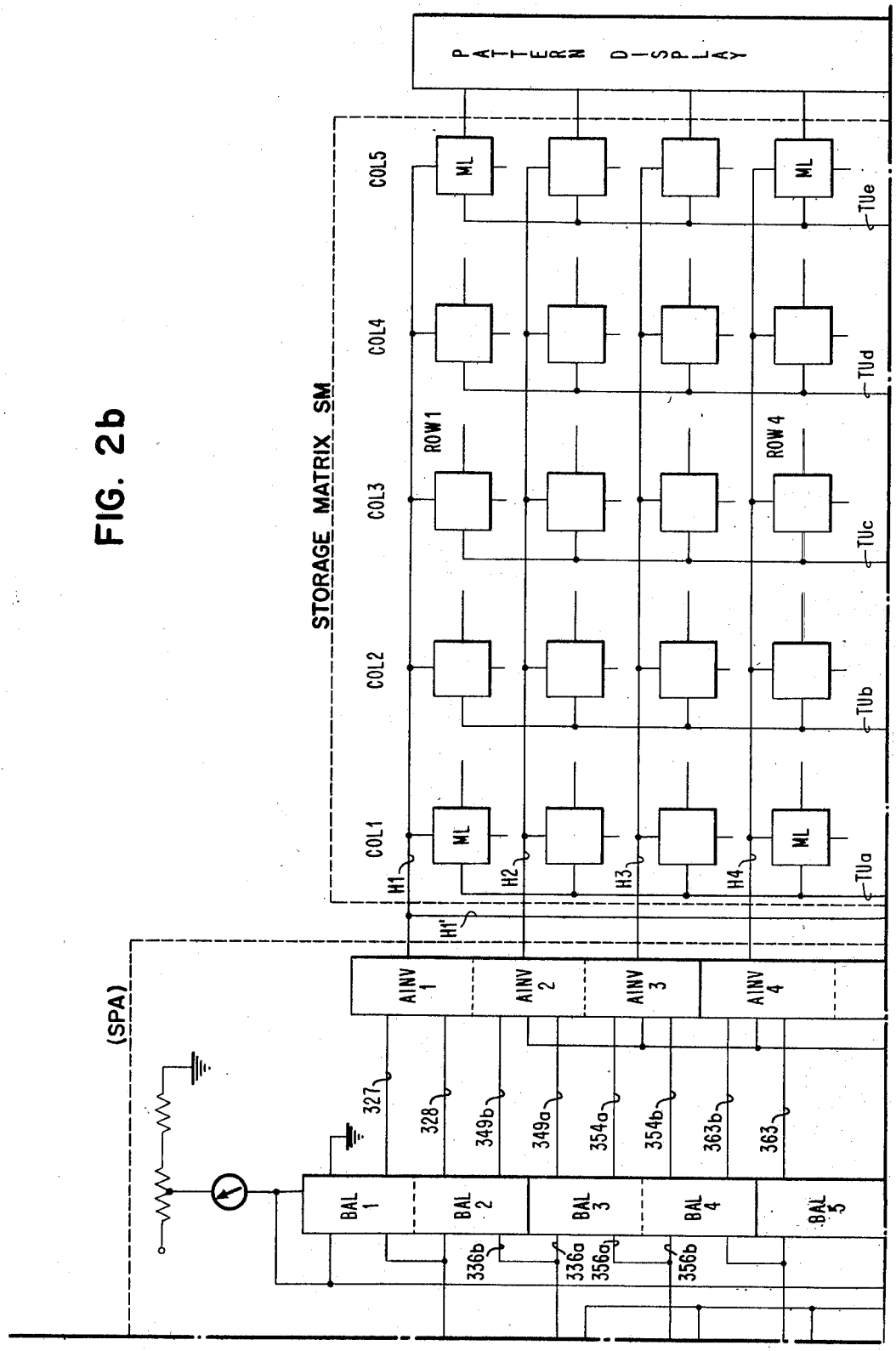
Figure 2C:
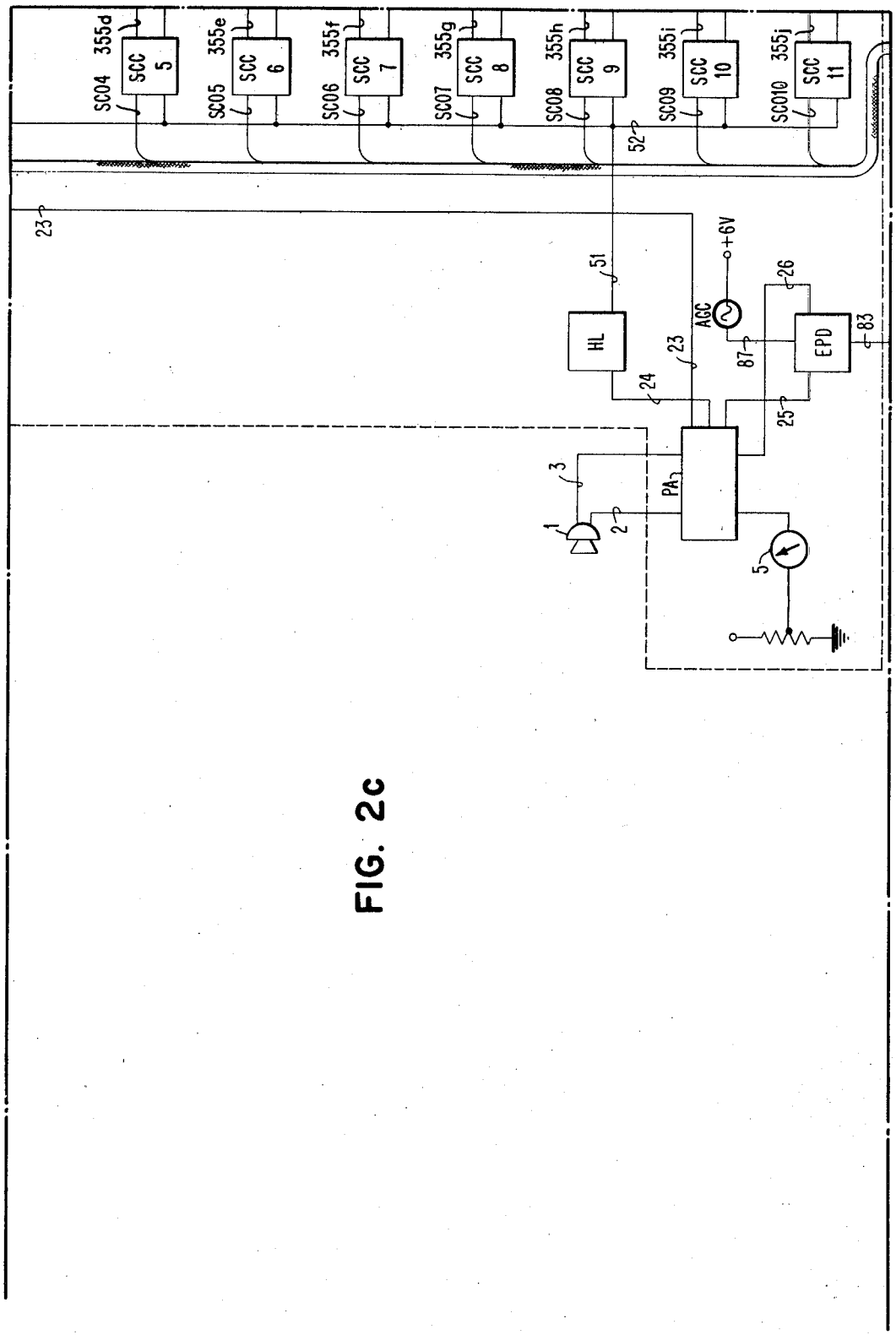
Figure 2E:
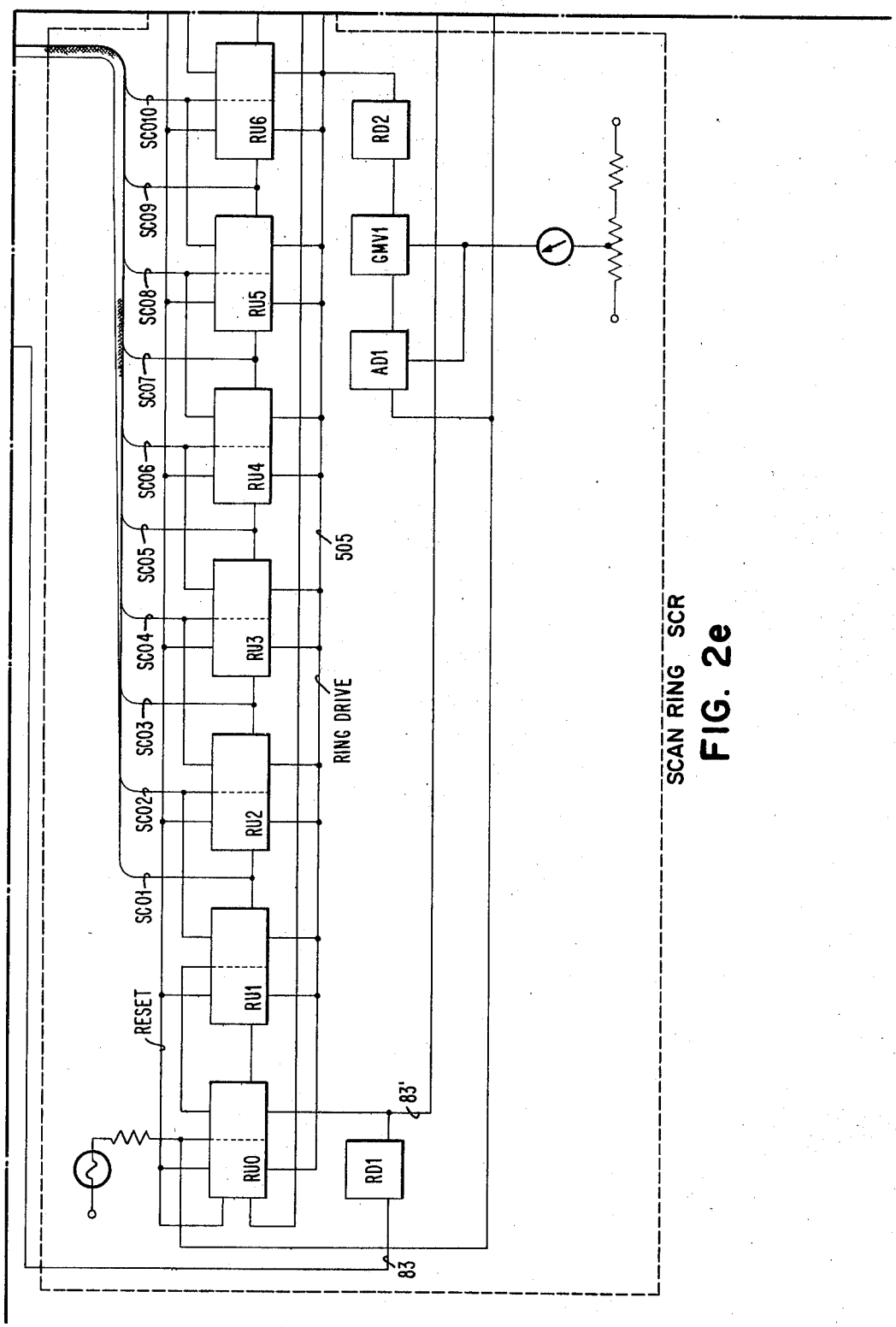

Referring to FIGS. 2a–2c, the speech analyzer admits speech through microphone 1 which issues a speech waveform along lines 2 and 3 to a preamplifier PA which provides a high frequency output on line 23 for operating the fricative selector FS, an output on line 24 representing a middle range of frequencies (from 250 c.p.s. to 3,000 c.p.s.) for operating the harmonic locator, and an output on line 25 which contains a low frequency component for operating the envelope peak detector EPD. The output from the fricative selector FS is issued on output line 121 to balance units 1 and 2 and consists of a D.C. voltage resulting from the rectified high frequency noise-like signals above 4 kc. The harmonic locator delivers points of peak amplitude abstracted from the waveform issuing from the preamplifier PA by way of line 24. The output from the harmonic locator is applied simultaneously to the scan counters SCC2–SCC11 by way of lines 51, 52. The low frequency output of line 25 is fed into the envelope peak detector EPD which, in conjunction with the automatic gain control means, functions as an amplifier whereby balanced integration is achieved to obtain the proper AGC range for controlling the preamplifier via line 26 and positive phased signals representing the fundamental voice output, issued on line 83, to initiate operations of the scan ring SCR shown in FIG. 2e. The output on line 83 is issued to a ring driver RD1 which provides the appropriate output on line 83′ to prepare the scan ring for operation. The advance of the scan ring is under control of drive pulses issued by means of a ring drive RD2 under control of gated multivibrator 1 cooperating with an adjustable delay AD1 shown at the bottom of FIG. 2e. Scan ring outputs SCO1 through SCO10 are applied respectively to inputs to the scan counters SCC2–SCC11 respectively and are gated with the harmonic locator output signal on line 51.

Initially the scan ring operations are started by depressing the reset key shown in FIG. 2f which energizes a delay switch DS1 shown in detail in FIG. 15 to provide a reset signal on reset lines R1*a*, R1*b*, and R1*c*. The reset signal on line R1*a* is applied to all matrix latches ML forming part of the storage matrix SM. The reset signals appearing on R1*b* and R1*c* are applied to reset the scan ring SCR and the time base ring.

The admission of speech signal waveforms into the various scan counters SCC2 through SCC11, including the fricative selector FS, are counted in the manner described and provide during a scan cycle of the scan ring signal eleven different measures of speech depending upon the character of the waveform signal. These measures of speech are developed by means of the balance circuits BAL1–BAL12 interconnected to the outputs from the fricative selector FS and the scan counters by way of output lines 121 and lines 355*a*–355*j*. Outputs from the balance units are issued by way of lines 327, 328, 349*a*, 349*b*, 354*a*, 354*b*, 363, 364*a*, 364*b*, 365*a*, 365*b*, 366*a*, 366*b*, 367*a*, 367*b*, 368*a*, 368*b*, 369*a*, 369*b*, 379*a*, 379*b* to the negative AND invert circuits AINV1–AINV11 further gated by a sample count signal issued on a line 380' connected to all of the negative AND invert circuits. This sample count signal is isued by the universal pulse generator UPG1 by way of lines 380' and 380, shown in FIG. 2*f*. The outputs H1–H11 from the negative AND invert circuits represent the eleven different speech measures which are issued to the storage matrix SM and stored under control of the time base ring outputs issued on lines TU*a*, TU*b*, TU*c*, TU*d*, TU*e*.

It must be appreciated that before speech is entered into the system, the talk key is depressed following a reset action. The termination of the reset signal turns on the right stage of the time base unit TU0, interlock A, and the scan stop RU0. Operations of the talk key turns on the right stage of the unit TU0 which turns off the left stage of the unit TU0. The universal pulse generator UPG3 provides a delayed output to avoid reception of a key noise. The positive going end of the pulse causes ring drive RD5 to turn on the right stage of the ring unit TU0, the outputs from which are passed on by way of lines 206, 207 to delay means AD1 which issues a downlevel signal on line 208 connected to AND-emitter follower AE2 and which at this time prevents operation of the multivibrator GMV2.

The first fundamental voice pulse, appearing on line 83' produces a pulse on the output line 265 of circuit OR1 that initiates operation of the timing ring by turning on ring unit TU1. As a result, the right stage of TU0 turns off and the resultant negative transient on line 207 causes the pulse generator UPG2 to issue an output, namely a positive reset count pulse, on line 227. This resets all of the scan counters in preparation for their use since, at the same time, the signal simultaneously appears on the line 83' to initiate operation of the scan ring SCR. The output on line 228, issued by pulse generator UPG2, produces a negative pulse whose positive termination causes driver RD4 to issue an advance ring pulse on the line 229 that turns on the right stage of ring unit TU1, the effect of which is to raise the signal level on the line TU*a* connected to the storage matrix. Following a brief interval, the signal on driver output line 208 goes positive by virtue of the fact that ring unit TU0 had gone negative thereby allowing the multivibrator control line 209 to rise. In addition, when the right stage of ring TU0 turns off and with no signal on the sibilant line H1', the circuit OR2 output on the line 230 goes negative and the exponential voltage generator EVG provides an exponential decay on the output line 230*a*. After a delay interval of about 60 milliseconds, depending upon the rate setting, the multivibrator GMV2 provides a positive rise on the output line 231 as the multivibrator begins operations. Since a first ring advance pulse appears prior to the operations of the multivibrator GMV1, the output from the delay unit AD2 maintains the right stage of interlock TU4 clamped off. Thus, the left stage of interlock TU4 is maintained in an ON state as the output on line 231 from the multivibrator GMV2 comes on. It follows that as the scan stop rises, all inputs to the AND-emitter follower AE1 are raised to their upper signal levels. Consequently, the output on line 236 from the AND-emitter follower AE1 rises and produces a negative sample count signal on the output lines 380, 380' influenced by the pulse generator UPG1. The positive end of the signal causes the pulse generator UPG2 to issue on line 227 a reset count pulse and, at the end of the negative pulse on line 228, a second advance ring pulse advances the time base ring from TU1 to TU2. The advance ring pulse turns on the right stage of interlock TU4, since the clamp was removed when the output on line 231 extending from the multivibrator 2 went positive. Scanning resumes and when the scan stop goes on again, a new time base advance pulse is prevented because the left stage of interlock TU4 is turned off when the right stage thereof comes on. The scanning continues as the counters accumulate until the multivibrator GMV2 turns off and on again. The output on line 233, issuing from the delay unit AD2 goes positive shortly after the multivibrator GMV2 provides a negative going signal on the line 231 and turns off the right stage of interlock TU4 while setting on the interlock A (the left stage of ring unit TU4). The following sequence of sampling, resetting and advancement of the ring occurs when the multivibrator GMV2 turns on and scanning has terminated in the manner described hereinabove.

As the result of a sustained fricative or sibilant sound, the signal levels on the lines H1 and H1' rise during which time the downlevel signal on the output line 208*a* extending from the inverter INV1 prevents the multivibrator control line 209 from rising. The input to the circuit OR2 by way of line 230 causes its output to rise and reset the exponential output on line 230*a* to its most positive upper level. If the sibilant sound occurs at the beginning of a word, "seven" for example, the positive rise on the line H1 initiates operations of the timer ring by virtue of the path extending from the driver RD3 and the line 264, circuit OR1 and the line 265. This advances the ring to unit TU1 whereby the sibilant sound is stored in column 1, row 1 of the storage matrix SM. Ring advance is held up until the sibilant sound terminates whereupon the multivibrator control line rises. When the fricative or sibilant sound occurs in the middle of a word, operations of the multivibrator are interrupted for the duration of the sound following which sampling of voiced sounds is resumed. The output from the exponential voltage generator is reset during the consonant so that the time base starts off more rapidly and slows down with time by virtue of which fine vowel detail may be sampled following a consonant since the termination of the consonant may be used as a time reference point. Although fricative or sibilant sounds are classed together in this system, further distinction may be made without altering the interlock principle described herein.

To illustrate the concept of transformation from a real time base to the non-linear time base, reference is invited to FIGS. 21*a*, 21*b*, 21*c*, 21*d*. In FIG. 21*a* a plot is developed of a time scan along the vertical axis versus real time along the horizontal axis. The latter is divided into 15 units of time with each unit representing four pitch periods which is equivalent to about 30 milliseconds for the average male voice. Eleven scanning operations HL1–HL11 divide the vertical axis. The array of numbers shown within this real time plot indicates the presence of an ill-defined pattern with uncertainties caused by formant glides. In time slots 1 and 2, for example, a formant moves from scan position 5 to scan position 4. As the formant crosses the boundary between scan positions 5 and 4, the harmonic locator output pulse registers in both time slots 1 and 2. In this example, three counts are registered in each scan time interval. A maximum of four could be registered in two adjacent scan times for each time slot should a formant dwell midway between scan times, the uncertainty being due to quantization of the speech measures.

Referring to FIG. 21b a plot of the same speech information is developed with the non-linear time base along the horizontal axis with total count (Σ) being represented by counts C1–C11 along the vertical axis. These summations represent the total of the counts appearing within the areas marked out by the vertical dotted lines VL1–VL5 in FIG. 21a. When only the circled maximum counts are noted in the polt of FIG. 21b, a definite pattern exists. These local maxima vary from four to nineteen and as such cannot be determined by a fixed threshold. A threshold of 2, for example, produces 15 extra bits or twice the number of total bits. On the other hand, the local maxima in count represent the true pattern of speech events for this particular speech utterance.

To determine the local maxima, each count is converted to an analog voltage by means of one of the appropriate scan counters in which each input adds an incremental voltage to the charge on the capacitor in the manner earlier described herein. After sampling, the charge is reduced to zero, or to a reference voltage, and the count is initiated for the next time period, the increment for each count being, for example, 0.2 volt. The underscored voltages in FIG. 21c represent the local maxima and are determined by the system of balance units employed in the invention. Referring to FIG. 21d, a plot of local maxima is shown on the vertical axis of the H lines H1–H11 and are plotted against the new time base divided into five periods, along the horizontal axis, each division from left to right representing the output lines TUa through TUe of the non-linear time base ring. The plot is a representation of the storage matrix SM employed in the present invention. The pattern representation of plus symbols is simpler and more meaningful than any pattern based on a threshold. This pattern represents the position of the harmonic locator scanned outputs with the highest probability of each time slot, with uncertain bits being eliminated.

A free-running multivibrator is often used to mark out units of real time. The rate is controlled by changing the charging time of certain capacitive coupling networks. This is usually done by varying a voltage E. Unfortunately, the duration T is not a linear function of E. It is expressed as follows:

$T = T_1 + T_2$ where $T_1$ is charging time for $C_1$ and $T_2$ is charging time for $C_2$ In the ordinary symmetrical multivibrator:

$$T = T_1 + T_2 \cong (R_1 C_1 + R_2 C_2) \log_e \frac{E_b - E_m}{E}$$

In the present invention a gated multivibrator is employed with fixed $T_1$ and a variable $T_2$. Further, the RC time constant will be fixed as will $E_b - E_m$. Thus, the expression may be written as:

$$T = T_1 + T_2 \cong T_1 + K_1 \log_e \frac{K_2}{E}$$

Now if E is made to decay exponentially, $T_2$ may be made to increase linearly with time as follows:

$$T_2 \cong K_1 \log_e \frac{K_2}{E} \text{ where } E = Ke^{-\frac{t}{RC}}$$

$$T_2 \cong K_1 \log_e \left(\frac{K_2}{K} e^{\frac{t}{RC}}\right) \cong \frac{K_1 T}{RC} + K_3$$

That is, the period $T_1$ which represents the time increment $\Delta T$ between successive values of T' varies linearly with increasing time, T.

A plot of the actual exponential voltage decay with time and the multivibrator characteristic is shown in FIG. 22. A table showing the resultant time intervals shows $\Delta t$ to be linear except for a slight increase of the last interval. This is 10 ms. out of a total time interval of 460 ms. or about 2%. Since the gated multivibrator turn-on time is less than the desired unit time of 30 ms., an adjustable delay adds enough extra time to make 30 ms.

Thus, the plot shows that the T' (1) is at 30 ms. E has fallen to +9.5 volts which corresponds to 60 ms. on the MV characteristic. 30+60=90 ms., the next point or T' (2). The voltage has now dropped to 6.3 volts for a new $\Delta T$ of 90 ms. 90+90=180 ms., where $\Delta T = 120$ ms., etc.

The following table shows the scan time in milliseconds and the approximate frequency ranges for the eleven speech measures H1–H11:

|  | Scan time (ms.) | $\frac{1}{T} \cong f$ |
|---|---|---|
| H1 |  | 4.7k–8.8k |
| H2 | 0.6–0.9 | 1.1k–1.7k |
| H3 | 0.9–1.2 | 833–1.1k |
| H4 | 1.2–1.5 | 667–833 |
| H5 | 1.5–1.8 | 555–667 |
| H6 | 1.8–2.1 | 476–555 |
| H7 | 2.1–2.4 | 416–476 |
| H8 | 2.4–2.7 | 370–416 |
| H9 | 2.7–3.0 | 333–370 |
| H10 | 3.0–3.3 | 303–333 |
| H11 | 3.3–3.6 | 277–303 |

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A speech analyzer or analyzing a speech waveform, comprising:
    an amplifier responsive to said speech waveform to provide a low frequency output, and a mid-range output indicative of the middle range of frequencies;
    detecting means responsive to said low frequency output to issue a voice fundamental output;
    a harmonic locator responsive to said mid-range output to provide appropriate harmonic signals representing the harmonic content in the waveform;
    a scan ring responsive to said voice fundamental output to issue a plurality of scan output signals;
    a plurality of scan counters jointly responsive to said harmonic signals and said scan outputs to issue count output signals representing the presence of different formant energies in the waveform;
    interconnected balance detectors responsive to said count output signal to provide formant signals representing the presence of different formant energies;
    sampling means providing count sample signals; and
    a plurality of coincidence devices responsive jointly to said count sample signals and said formant signals to provide a plurality of different speech measure output signals.

2. A system as in claim 1 further including a timing ring for issuing a plurality of time base output signals, and a storage matrix constituted of a plurality of coincidence type storage latches jointly repsonsive to said speech measure output signals and said time base output signals for storing coded representations of said speech measures.

3. A system as in claim 2 further including time control means for said time base ring for issuing ring advance signals.

4. A system as in claim 3 in which said time control means includes an exponential voltage generator for providing a non-linear time function.

5. A system as in claim 4 further including interlock control means for synchronizing the operations of said scan ring and said time base ring.

6. A system as in claim 2 in which said amplifier further provides a high frequency output indicative of the fricative and sibilant content in the speech waveform including means responsive to said high frequency output to provide an appropriate speech measure.

7. A system as in claim 6 further including means interconnected to said time base ring for initiating operations thereof in response to a speech waveform commencing with a fricative or sibilant.

8. A system as in claim 4 further including a multivibrator interconnected with said exponential voltage generator for controlling the rate of issuance of the advance pulses to said time base ring.

9. A system as in claim 8 further including pulse rate control means interconnected to said multivibrator.

References Cited

UNITED STATES PATENTS

| 3,296,374 | 1/1967 | Clapper | 179—1 |
| 3,395,249 | 7/1968 | Clapper | 179—1 |

KATHLEEN H. CLAFFY, Primary Examiner

J. B. LEAHEEY, Assistant Examiner

U.S. Cl. X.R.

179—15.55